United States Patent
Chung et al.

(10) Patent No.: US 11,025,101 B2
(45) Date of Patent: Jun. 1, 2021

(54) WIRELESS POWER TRANSMITTER AND CONTROL METHOD THEREOF

(71) Applicant: Samsung Electronics Co., Ltd., Suwon-si (KR)

(72) Inventors: Hyung-Koo Chung, Suwon-si (KR); Sung-Ku Yeo, Suwon-si (KR); Ki-Young Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 261 days.

(21) Appl. No.: 15/230,680

(22) Filed: Aug. 8, 2016

(65) Prior Publication Data

US 2017/0070104 A1 Mar. 9, 2017

(30) Foreign Application Priority Data

Sep. 9, 2015 (KR) .................. 10-2015-0127818

(51) Int. Cl.
*H02J 50/80* (2016.01)
*H02J 50/10* (2016.01)
*H02J 50/40* (2016.01)
*H02J 7/02* (2016.01)

(52) U.S. Cl.
CPC .............. *H02J 50/80* (2016.02); *H02J 50/10* (2016.02); *H02J 50/40* (2016.02); *H02J 7/025* (2013.01)

(58) Field of Classification Search
CPC .. H02J 50/20; H02J 7/025; H02J 50/10; H02J 50/12; H02J 50/40; H02J 50/80
USPC .......................................... 320/108; 307/104
See application file for complete search history.

(56) References Cited

U.S. PATENT DOCUMENTS

| | | | | |
|---|---|---|---|---|
| 9,397,505 B2* | 7/2016 | Lee | ......................... | H02J 5/005 |
| 9,419,465 B2* | 8/2016 | van Lammeren | ....... | H02J 5/005 |
| 9,496,741 B2* | 11/2016 | Lee | ......................... | H02J 7/007 |
| 9,948,129 B2* | 4/2018 | Singh | ...................... | H02J 7/025 |
| 10,658,847 B2* | 5/2020 | Peralta | ..................... | H01Q 7/00 |
| 2011/0127843 A1* | 6/2011 | Karaoguz | .............. | H02J 7/025 |
| | | | | 307/104 |

(Continued)

FOREIGN PATENT DOCUMENTS

JP 2013-225962 10/2013
KR 10-2012-0125968 A 11/2012

(Continued)

OTHER PUBLICATIONS

Int'l Search Report and Written Opinion for PCT/KR2016/009980 dated Dec. 9, 2016.

(Continued)

*Primary Examiner* — David V Henze-Gongola
(74) *Attorney, Agent, or Firm* — Sughrue Mion, PLLC

(57) ABSTRACT

A wireless power transmitter for charging a wireless power receiver is provided. The wireless power transmitter includes a power transmission unit configured to transmit power for charging the wireless power receiver, by using a current applied to the power transmission unit, a communication module configured to receive out-of-band communication signal from the wireless power receiver and a controller configured to apply the current to the power transmission unit to transmit power in response to receiving the out-of-band communication signal from the wireless power receiver.

13 Claims, 15 Drawing Sheets

(56) References Cited

U.S. PATENT DOCUMENTS

| | | | |
|---|---|---|---|
| 2011/0136550 A1* | 6/2011 | Maugars | H02J 7/025 455/573 |
| 2012/0098485 A1 | 4/2012 | Kang et al. | |
| 2012/0139358 A1* | 6/2012 | Teggatz | H01F 38/14 307/104 |
| 2012/0299389 A1 | 11/2012 | Lee et al. | |
| 2013/0127404 A1* | 5/2013 | Maenpaa | H02J 7/025 320/108 |
| 2013/0214743 A1 | 8/2013 | Vorenkamp et al. | |
| 2014/0266018 A1* | 9/2014 | Carobolante | H02J 7/025 320/108 |
| 2014/0285141 A1 | 9/2014 | Lee et al. | |
| 2014/0298447 A1 | 10/2014 | Chu | |
| 2014/0327390 A1* | 11/2014 | Park | H02J 7/025 320/108 |
| 2015/0042169 A1 | 2/2015 | Park et al. | |
| 2015/0244201 A1 | 8/2015 | Chu | |
| 2016/0126002 A1* | 5/2016 | Chien | H04B 5/0031 320/108 |
| 2016/0308587 A1* | 10/2016 | Lee | H04B 5/0056 |
| 2016/0336804 A1 | 11/2016 | Son et al. | |
| 2016/0345125 A1* | 11/2016 | Kim | H04B 5/0031 |
| 2017/0040696 A1* | 2/2017 | Peralta | H01F 38/14 |
| 2017/0353054 A1* | 12/2017 | Lee | H02J 50/12 |

FOREIGN PATENT DOCUMENTS

| | | |
|---|---|---|
| KR | 10-2012-0132225 | 12/2012 |
| KR | 10-2014-0101665 A | 8/2014 |
| KR | 10-2014-0115896 | 10/2014 |
| KR | 10-2015-0017807 | 2/2015 |
| WO | 2015-102454 | 7/2015 |

OTHER PUBLICATIONS

Extended European Search Report Appln No. 16844659.9 dated Apr. 24, 2018 (7 pgs).

* cited by examiner

WIRELESS POWER TRANSMITTER AND CONTROL METHOD THEREOF

RELATED APPLICATION(S)

This application claims the benefit under 35 U.S.C. § 119(a) of a Korean patent application filed in the Korean Intellectual Property Office on Sep. 9, 2015 and assigned Serial No. 10-2015-0127818, the entire disclosure of which is incorporated herein by reference.

BACKGROUND

Various embodiments of the present disclosure relate to a wireless power transmitter and a control method thereof, and more particularly, to a wireless power transmitter capable of wirelessly charging a wireless power receiver and communicating with a wireless power receiver, and a control method thereof.

A mobile terminal, such as a portable phone or a PDA (Personal Digital Assistant), uses rechargeable battery. In order to charge such a battery, electric energy is supplied by a separate charging device that plugs into the mobile device, or otherwise mates the contact terminals of the mobile device to contact terminals of the charging device. However, this type of charging method exposes the contact terminals on the mobile device and/or the charging device to the environment. Accordingly, the contact terminals may get contaminated by foreign matter, thereby interfering with charging the battery. Additionally, the exposed contact terminals on the mobile device may make it harder to make the mobile device water resistant.

Wireless charging, or contactless charging, technology has been developed and used for a number of electronic devices. Such wireless charging technology uses wireless power transmission and reception. The wireless charging technology allows a battery to be charged by merely putting a mobile device, such as a cell phone, on a charging pad without connecting the portable phone to a separate charging device. Wireless charging technology is used for many devices currently, including for wireless electric toothbrushes and wireless electric shavers. It is expected that wireless charging technology will advance significantly as electric cars become more common.

Presently, wireless charging technology main interest is with the inductive coupling method (inductive method), the resonance inductive coupling method (resonance method), and the RF/microwave radiation method. When power is transferred by the inductive coupling method, referred to in this disclosure as the inductive method, current in a primary coil generates a magnetic field, and that magnetic field induces current in a secondary coil. Power transmission using inductive coupling has excellent energy transmission efficiency. However, the primary and secondary coils must be very close to each other for efficient energy transfer. Coils may also be referred to as inductors.

The resonance inductive coupling method, referred to in this disclosure as the resonance method, is a type of inductive coupling method where both the transmitter and the receiver have circuits tuned to a specific frequency. Professor Soljacic at MIT demonstrated this wireless charging system in 2005 by transferring power to an electronic device several meters away using Coupled Mode Theory. The resonance method uses the concept of resonance frequency, where resonance frequency is a characteristic of all objects. An object may preferentially generate or receive energy at its resonance frequency. For example, when a tuning fork is struck, it will vibrate at its resonance frequency. A wine glass near the turning fork with the same resonance frequency will absorb the acoustic energy of the vibrations generated by the tuning fork until the wine glass shatters. Similarly, a power transmitter using the resonance method generates a magnetic field of a specific frequency. Energy is transferred via that magnetic field only when there is a receiving device with receiving circuitry that has that resonance frequency. Due to larger distances between the transmitting device and the receiving device, the resonance method may have lower energy transmission efficiency than the inductive method.

The conventional procedure in which a wireless power transmitter detects the disposition of a wireless power receiver is suggested by the wireless charging standard. For example, in the alliance for wireless power (A4WP) standard, a wireless power transmitter applies detection power to a resonator at predetermined intervals. The wireless power transmitter may determine whether a wireless power receiver is disposed near the wireless power transmitter by detecting change in load impedance during the detection power application periods. This need to apply detection power increases power consumption and heat generation.

In particular, for a relatively small wireless power receiver (e.g., a small electronic device such as a wearable electronic device), the wireless power transmitter should apply relatively higher detection power to the wireless power receiver, so the above problems may be worse.

The above information is presented as background information only to assist with understanding the present disclosure. No determination has been made, and no assertion is made, as to whether any of the above might be applicable as prior art with regard to the present disclosure.

SUMMARY

An aspect of various embodiments of the present disclosure is to provide a wireless power transmitter for detecting a wireless power receiver based on the detection of an out-of-band communication signal, and a control method thereof.

In accordance with one aspect of the present disclosure, there is provided a wireless power transmitter for charging a wireless power receiver. The wireless power transmitter includes a power transmission unit configured to transmit power, a communication module configured to receive out-of-band communication, and a controller configured to apply a current to the power transmission unit to transmit power in response to receiving the out-of-band communication.

In accordance with another aspect of the present disclosure, there is provided a wireless power transmitter for charging a wireless power receiver. The wireless power transmitter includes a coil, a communication module configured to communicate with the wireless power receiver using out-of-band communication, and a controller. The controller may be configured to transmit charging power to the wireless power receiver by applying a first current, which is output by a wireless charging unit, from a first point of the coil to a second point of the coil. The controller may also be configured to transmit the out-of-band communication signal to the wireless power receiver by applying a second current, which is output by the communication module, from the first point of the coil to a third point of the coil. The controller may also be configured to control conveying the out-of-band communication from the wireless power receiver, received as a third current in the section of the coil from the first point of the coil to the third point of the coil, to the communication module.

In accordance with further another aspect of the present disclosure there is provided a wireless power transmitter for charging a wireless power receiver. The wireless power transmitter includes a coil and a controller. The controller may be configured to apply a first current from a first point of the coil to a second point of the coil to transmit charging power to the wireless power receiver based on a first wireless charging standard scheme. The controller may also be configured to apply a second current from the first point of the coil to a third point of the coil to transmit charging power to the wireless power receiver based on a second wireless charging standard scheme.

In accordance with yet another aspect of the present disclosure there is provided a wireless power transmitter for charging a wireless power receiver. The wireless power transmitter includes a coil, a first communication module configured to communicate with the wireless power receiver based on a first communication scheme, a second communication module configured to communicate with the wireless power receiver based on a second communication scheme, and a controller. The controller may be configured to apply a first current, output from the first communication module, from a first point of the coil to a second point of the coil to transmit out-of-band communication that is based on the first communication scheme to the wireless power receiver. The controller may be further configured to apply a second current, output from the second communication module, from the first point of the coil to a third point of the coil to transmit out-of-band communication that is based on the second communication scheme to the wireless power receiver.

In accordance with still another aspect of the present disclosure, there is provided a control method of a wireless power transmitter for charging a wireless power receiver. The control method includes receiving an out-of-band communication from the wireless power receiver, and transmitting power to the wireless power receiver by applying a power charging current to a power transmission unit in response to receiving the out-of-band communication.

Other aspects, advantages, and salient features of the disclosure will become apparent to those skilled in the art from the following detailed description, which, taken in conjunction with the accompanying drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
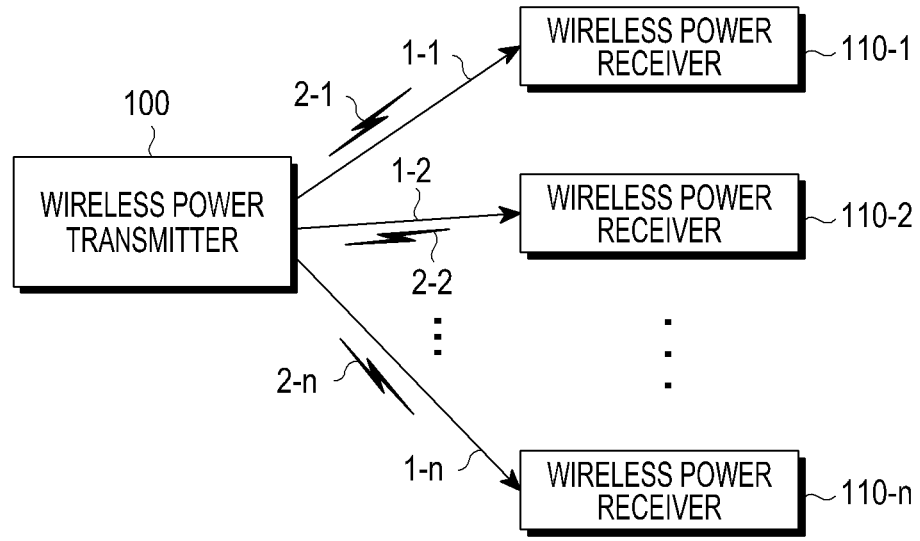
FIG. 1 is a diagram illustrating the overall operation of a wireless charging system.

Various embodiments of the present disclosure will be described with reference to the accompanying drawings. However, it should be understood that there is no intent to limit the present disclosure to the particular forms disclosed herein. Rather, the present disclosure should be construed to cover various modifications, equivalents, and/or alternatives of embodiments of the present disclosure. In describing the drawings similar reference numerals may be used to designate similar elements.

An expression such as "comprising," or "may comprise" may be used in the present disclosure to indicate existence of a corresponding function, operation, or component, and does not exclude existence of additional functions, operations, or components. In the present disclosure, the terms "comprising," "having," and "including" indicates a characteristic, a number, a step, a component, a part, a part, or a combination thereof, and should not be construed as excluding existence or a possibility of addition of one or more other characteristics, numbers, steps, operations, components, parts, or combinations thereof.

In the present disclosure, an expression such as "A and/or B," "at least one of A and B," or "one or more of A and B" may include all possible combinations of together listed items. For example, "A and/or B," "at least one of A and B," or "one or more of A and B" may include (1) at least one A, (2) at least one B, or (3) both at least one A and at least one B. The expression "A or B" indicates that either A is selected or B is selected.

Expressions such as "first," "second," "primary," or "secondary" used in descriptions of various exemplary embodiments may represent various elements regardless of order and/or importance and do not necessarily indicate relative importance of or specific order of corresponding elements. The expressions may be used for distinguishing one element from another element. For example, a first user device and a second user device may represent different user devices without regard to order or importance. Accordingly, a first element may be referred to as a second element without deviating from the scope of the present disclosure, and similarly, a second element may be referred to as a first element.

When it is described that a first element is "operatively or communicatively coupled" or "connected" to a second element, the first element can be directly connected to the second element or it can be connected to the second element through a third element. However, when it is described that a first element is "directly connected" or "directly coupled" to a second element, it means that there is no intermediate element (such as a third element) between the first element and the second element.

The expression "configured to" used in the present disclosure may be replaced with, for example, "set to," "suitable for," "having the capacity to," "designed to," "adapted to," "made to," or "capable of" according to a situation. The expression "configured to" does not necessarily mean "specifically designed to" do a function by hardware. Alternatively, in some situation, an expression "apparatus configured to" may mean that the apparatus can operate together with another apparatus or component. For example, the phrase "a processor configured to perform A, B, and C" may refer to a generic-purpose processor (such as a CPU or an application processor) that can perform a corresponding operation by executing at least one software program stored at a memory device or an exclusive processor (such as an embedded processor) for performing a corresponding operation.

Terms defined in the present disclosure are used only for describing a specific exemplary embodiment and does not necessarily limit the scope of other exemplary embodiments. When used in the present disclosure and the appended claims, a singular form may also encompass the plural form unless it is explicitly stated otherwise. All terms including technical terms and scientific terms used here may have the same meaning as generally understood by a person of ordinary skill in the art. Terms defined in a dictionary have the same meaning as or a meaning similar to that of a context of related technology and should not be analyzed to have an ideal or excessively formal meaning unless explicitly defined as such. Terms defined in the present disclosure should not be analyzed to exclude the present exemplary embodiments.

A wireless power transmitter and/or a wireless power receiver, according to various embodiments of the present disclosure, may be included in various electronic devices. For example, the electronic device may include at least one of a smartphone, a tablet personal computer (tablet PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

First, reference will be made to FIG. 1 that illustrates a wireless charging system that can be applied to an embodiment of the present disclosure.

FIG. 1 is a diagram illustrating the overall operation of a wireless charging system. As shown in FIG. 1, the wireless charging system may include a wireless power transmitter 100 and at least one or more wireless power receivers 110-1, 110-2 and 110-$n$.

The wireless power transmitter 100 may transmit powers 1-1, 1-2, . . . , 1-$n$ to the one or more wireless power receivers 110-1, 110-2, . . . , 110-$n$, respectively. More specifically, the wireless power transmitter 100 may transmit powers 1-1, 1-2, . . . , 1-$n$ only to those wireless power receivers 110-1, 110-2, . . . , 110-$n$ that have been authenticated through a predetermined authentication procedure. The wireless power transmitter 100 may transmit wireless power based on, for example, the inductive method or the resonance method.

The wireless power transmitter 100 may conduct bidirectional communication with the wireless power receivers 110-1, 110-2, . . . , 110-$n$. The wireless power transmitter 100 and the wireless power receivers 110-1, 110-2, . . . , 110-$n$ may use packets 2-1, 2-2, . . . , 2-$n$, respectively, for communication, where the packets may be configured as frames at lower network levels. The wireless power receiver may be, for example, a mobile terminal such as, for example, a PDA, a PMP, a smartphone, etc.

The wireless power transmitter 100 may provide power to the plurality of wireless power receivers 110-1, 110-2, . . . , 110-$n$ in a wireless manner. For example, the wireless power transmitter 100 may transmit power to the plurality of wireless power receivers 110-1, 110-2, . . . , 110-$n$ through the resonance method. When the wireless power transmitter 100 uses the resonance method, the distance between the wireless power transmitter 100 and the plurality of wireless power receivers 110-1, 110-2, . . . , 1110-$n$ may be, for example, 30 m or less. When the wireless power transmitter 100 uses the inductive method, the distance between the wireless power transmitter 100 and the plurality of wireless power receivers 110-1, 110-2, . . . , 110-$n$ may be, for example, 10 cm or less.

Each of the wireless power receivers 110-1, 110-2, . . . , and 110-$n$ may charge its associated battery by receiving the wireless power from the wireless power transmitter 100. In addition, each of the wireless power receivers 110-1, 110-2, . . . , 110-$n$ may transmit a signal for requesting wireless power transmission, information needed for receiving wireless power, wireless power receiver state information, wireless power transmitter 100 control information, or the like to the wireless power transmitter 100.

In addition, each of the wireless power receiver 110-1, 110-2, . . . , and 110-$n$ may transmit a message indicating the charge state of its associated battery to the wireless power transmitter 100.

The wireless power transmitter 100 may include, for example, a display that can indicate the state of each of the wireless power receivers 110-1, 110-2, . . . , 110-$n$ based on massages received from the wireless power receivers 110-1, 110-2, . . . , 110-$n$. The wireless power transmitter 100 may also be able to indicate an expected time until the charging of each of the wireless power receivers 110-1, 110-2, . . . , 110-$n$ is completed, as appropriate.

The wireless power transmitter 100 may also transmit control signals to each of the wireless power receivers 110-1, 110-2, . . . , 110-$n$ to disable its respective wireless charging function. A wireless power receiver that has received the control signal to disable its wireless charging function may then proceed to disable its wireless charging function.

Figure 2:
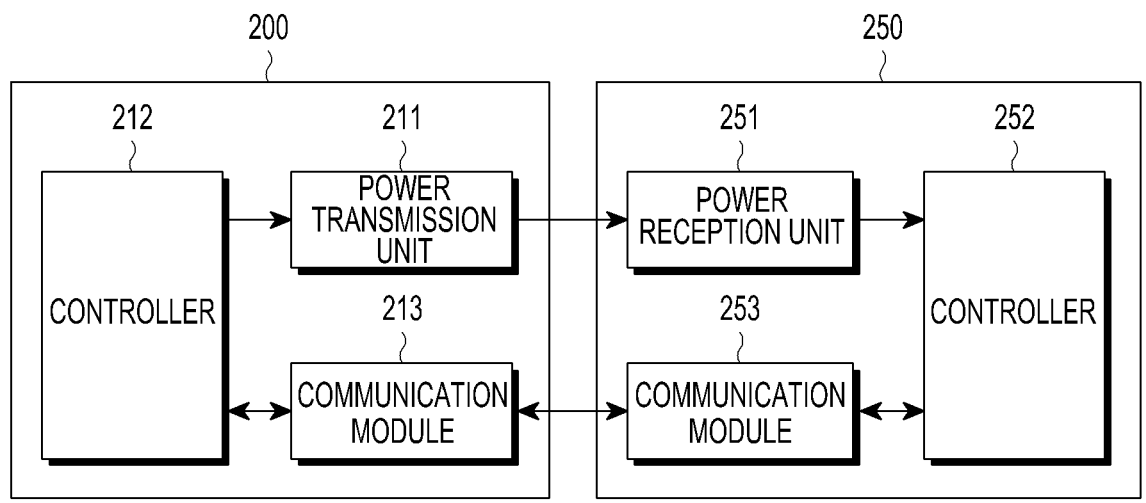
FIG. 2 is a block diagram of a wireless power transmitter and a wireless power receiver according to an embodiment of the present disclosure.

FIG. 2 is a block diagram of a wireless power transmitter and a wireless power receiver according to an embodiment of the present disclosure.

As shown in FIG. 2, a wireless power transmitter 200 may include a power transmission unit 211, a controller 212, and a communication module 213. In addition, the wireless power receiver 250 may include a power reception unit 251, a controller 252, and a communication unit 253.

The power transmission unit 211 may provide the power required by the wireless power transmitter 200, and may wirelessly provide power to the wireless power receiver 250. The power transmission unit 211 may supply alternating current (AC) power, and may also supply direct current (DC) power that is converted into AC power using an inverter. The power transmission unit 211 may be implemented in the form of a built-in battery, or may be implemented in the form of a power reception interface to receive power from the outside and supply the received power to other components. Those skilled in the art will readily understand that the power transmission unit 211 is not limited as long as the power transmission unit 211 is capable of providing AC power according to specifications for one or more embodiments of the present disclosure.

In addition, the power transmission unit 211 may transmit AC power to the wireless power receiver 250. The power transmission unit 211 may further include a resonant circuit or an inductive circuit for transmitting and receiving specified electromagnetic waves. When the power transmission unit 211 is implemented with a resonant circuit, an inductance L of a loop coil of the resonant circuit may be changed. Those skilled in the art will readily understand that the power transmission unit 211 is not limited as long as the power transmission unit 211 is capable of transmitting and receiving electromagnetic waves.

The controller 212 may control the overall operation of the wireless power transmitter 200. The controller 212 or the controller 252 may control the overall operation of the wireless power transmitter 200 by executing an algorithm, program, or application that is read from a storage medium (not shown). The controller 212 may be implemented in the form of a central processing unit (CPU) such as, for example, a microprocessor. The controller 252 may control the overall operation of the wireless power transmitter 200.

The communication module 213 may perform communication with the wireless power receiver 250 in a predetermined manner. The communication module 213 may perform communication with the communication module 253 of the wireless power receiver 250 using, for example, near field communication (NFC), ZigBee, infrared data association (IrDA), visible light communication (VLC), Bluetooth, or Bluetooth low energy (BLE). The communication module 213 may use, for example, the carrier sense multiple access with collision avoidance (CSMA/CA) algorithm. The above-described communication schemes are merely illustrative, and the scope of embodiments of the present disclosure is not limited to a specific communication scheme.

The communication module 213 may transmit information about the wireless power transmitter 200. The communication module 213 may unicast, multicast or broadcast the information. The communication module 213 may receive power information from the wireless power receiver 250. The power information may include at least one of battery related terms for the wireless power receiver 250 such as, for example, battery capacity, remaining battery level, number of charging, usage, etc.

The communication module 213 may transmit a charging function control signal to control the charging function of the wireless power receiver 250. The charging function control signal may be a control signal for enabling or disabling the charging function by controlling the power reception unit 251 of the wireless power receiver 250. The communication module 213 may also communicate not only with the wireless power receiver 250, but also with another wireless power transmitter (not shown).

The wireless power transmitter 200 and the wireless power receiver 250 may communicate with each other to allow the wireless power receiver 250 to join the wireless power network controlled by the wireless power transmitter 200. The power reception unit 251 may receive wireless power from the power transmission unit 211 based on the inductive method or the resonance method.

In various embodiments of the present disclosure, the power transmission unit 211 may transmit power to the wireless power receiver 250, which may use the transmitted power to charge a battery. The communication module 213 may receive an out-of-band communication signal from the wireless power receiver 250. The controller 212 may be configured to have the power transmission unit 211 transmit power in response to the reception of the communication signal. This may also be phrased as applying current to the power transmission unit 211. In various embodiments of the present disclosure, the communication module 213 may receive an NFC related signal as the communication signal. In various embodiments of the present disclosure, the communication module 213 may receive the NFC related signal in an active mode. In various embodiments of the present disclosure, the communication module 213 may use a passive mode by generating a radio frequency (RF) carrier field, and receive the NFC related signal generated by another device modulating the RF carrier field.

In various embodiments of the present disclosure, the communication module 213 may form an NFC pairing with the wireless power receiver 250 in response to reception of the NFC related signal, and the controller 212 may apply a current to the power transmission unit 211 in response to the formed NFC pairing, and control the communication module 213 to release the formed NFC pairing after applying the current. Applying current to the power transmission unit 211 may allow the power transmission unit 211 to transmit power.

In various embodiments of the present disclosure, the communication module 213 may receive a magnetic secure transfer (MST) related signal as the communication signal. In various embodiments of the present disclosure, the communication module 213 may receive the MST related signal in an active mode. In various embodiments of the present disclosure, the communication module 213 may use a passive mode by generating an RF carrier field, and receive the MST related signal generated by another device modulating the RF carrier field.

In various embodiments of the present disclosure, the communication module 213 may form an MST pairing with the wireless power receiver 250 in response to the reception of the MST related signal, and the controller 212 may apply a current to the power transmission unit 211 in response to the formed MST pairing, and control the communication module 213 to release the formed MST pairing after applying the current.

In various embodiments of the present disclosure, the controller 212 may not apply current to the power transmission unit 211 before reception of the communication signal. In various embodiments of the present disclosure, the controller 212 may determine a communication type of the communication signal, and activate at least one sub-communication module of the communication module 213 based on a result of the determination. In various embodiments of the present disclosure, the communication module 213 may include a plurality of sub-communication modules, each of which operates based on a different communication scheme, and the plurality of sub-communication modules may share a coil.

In various embodiments of the present disclosure, a first input of each of the plurality of sub-communication modules may be connected to a first point of the coil and a second input of each of the plurality of sub-communication modules may be connected to a different point of the coil, so a length of a coil corresponding to each of the plurality of sub-communication modules may be different. In various embodiments of the present disclosure, the wireless power transmitter 200 may further include a plurality of switches, each of which is disposed between each of the plurality of sub-communication modules and the coil, and the controller 212 may control each of the plurality of switches based on a type of the communication signal received at the communication module 213.

In various embodiments of the present disclosure, the power transmission unit 211 may include a plurality of sub-power transmission units, each of which operates based on a different wireless charging standard, and the plurality of sub-power transmission units may share a coil. In various embodiments of the present disclosure, the wireless power transmitter 200 may further include a plurality of switches, each of which is disposed between each of the plurality of sub-power transmission units and the coil, and the controller 212 may control each of the plurality of switches in response to the determined wireless charging standard.

In various embodiments of the present disclosure, a first input of each of the plurality of sub-power transmission units may be connected to a first point of the coil and a second input of each of the plurality of sub-power transmission units may be connected to a different point of the coil, so a length of a coil corresponding to each of the plurality of sub-power transmission units may be different.

In various embodiments of the present disclosure, the power transmission unit 211 and the communication module 213 may share a coil. In various embodiments of the present disclosure, the wireless power transmitter 200 may further include a first switch disposed between the power transmission unit 211 and the coil, and a second switch disposed between the communication module 213 and the coil. The controller 212 may close the first switch while the wireless power transmitter 200 is charging the wireless power receiver 250, and the controller 212 may open the first switch and close the second switch while the wireless power transmitter 200 is in a standby mode.

In various embodiments of the present disclosure, a first input of each of the power transmission unit 211 and the communication module 213 may be connected to a first point of the coil and a second input of each of the power transmission unit 211 and the communication module 213 may be connected to a different point of the coil, so a length of a coil corresponding to each of the power transmission unit 211 and the communication module 213 may be different.

In various embodiments of the present disclosure, a width of a coil corresponding to each of the power transmission unit 211 and the communication module 213 is different. In various embodiments of the present disclosure, a width of a coil corresponding to the power transmission unit 211 may be greater than a width of a coil corresponding to the communication module 213.

Figure 3A:
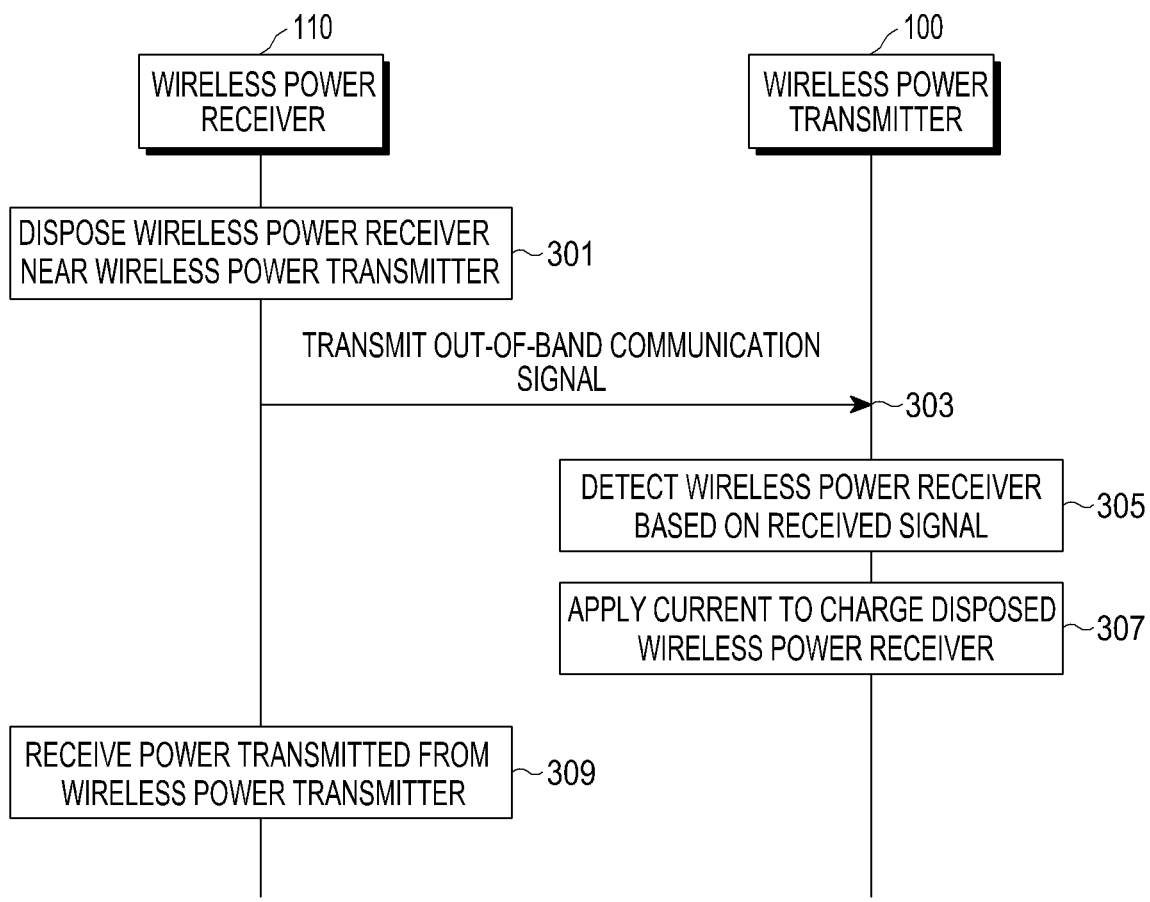
FIG. 3A is a flowchart illustrating operations of a wireless power transmitter and a wireless power receiver according to various embodiments of the present disclosure.

FIG. 3A is a flowchart illustrating operations of a wireless power transmitter and a wireless power receiver according to various embodiments of the present disclosure.

In operation 301, a wireless power receiver 110 may be disposed near a wireless power transmitter 100. For example, the user may place the wireless power receiver 110 within a charging range of the wireless power transmitter 100 for wireless charging.

In operation 303, the wireless power receiver 110 may transmit an out-of-band communication signal to the wireless power transmitter 100. For example, the wireless power receiver 110 may transmit a communication signal specified in an NFC communication scheme or an MST communication scheme to the wireless power transmitter 100. If the wireless power receiver 110 has enough charge left, the wireless power receiver 110 may transmit a communication signal to the wireless power transmitter 100. Otherwise, if the battery of the wireless power receiver 110 is discharged, the wireless power receiver 110 may transmit a communication signal using the power that is wirelessly provided from the wireless power transmitter 100.

More specifically, the wireless power receiver 110 may use a communication module that supports a passive mode of communication. In the passive mode, the wireless power receiver 110 may wirelessly receive power provided by a reader (e.g., a wireless power transmitter) according to the supported passive mode, and transmit a communication signal using the received power. Operations of the wireless power receiver 110 and the wireless power transmitter 100 in the passive mode will be described below in more detail.

In various embodiments of the present disclosure, there is no limitation on the type of communication that is supported by the wireless power receiver 110. Although the wireless power receiver 110 is assumed to transmit an NFC signal or an MST signal in the foregoing description, the wireless power receiver 110 may transmit a communication signal based on various types of communication schemes such as, for example, Bluetooth, ZigBee and VLC, and there is no limitation on the type of the communication scheme.

In operation 305, the wireless power transmitter 100 may detect the wireless power receiver 110 based on the received communication signal. The wireless power transmitter 100 may operate a communication module included in the wireless power transmitter 100 periodically or aperiodically to detect communication from a wireless power receiver. The amount of power consumed by the communication module may be less than the amount of power that a conventional wireless power transmitter uses for detection of a wireless power receiver.

In operation 307, the wireless power transmitter 100 may apply a current to its power transmission unit for charging the wireless power receiver 110. In operation 309, the wireless power receiver 110 may receive the power transmitted from the wireless power transmitter 100. For example, the power transmission unit may include at least one of a coil and a resonant circuit, and the resonant circuit may also include a coil. The wireless power transmitter 100 may apply a current to a coil of the power transmission unit. In a case where the power transmission unit of the wireless power transmitter 100 uses the inductive method, the coil may form a magnetic field using the applied current. The wireless power receiver 110 may include a secondary coil. Current may be induced in the secondary coil of the wireless power receiver 110 by the magnetic field. The wireless power receiver 110 may use the induced current to charge its battery.

Furthermore, in a case where the power transmission unit of the wireless power transmitter 100 uses the resonance method, a resonant circuit including a coil and a capacitor may generate a magnetic field using the applied current. The wireless power receiver 110 may include a resonant circuit having the same resonant frequency as that of the wireless power transmitter 100. Current may be induced in the resonant circuit of the wireless power receiver 110 by the electromagnetic fields. The wireless power receiver 110 may use the induced current to charge its battery.

As described above, the wireless power transmitter 100 may detect the wireless power receiver 110 even though the wireless power transmitter 100 does not transmit detection power to detect the wireless power receiver 110, solving the problem that the power consumption and the heating value are increased by the detection power. In particular, after forming an NFC pairing or an MST pairing using an NFC related signal or an MST related signal, the wireless power transmitter 100 may keep communicating with the wireless power receiver 110 even after wireless charging starts. This allows the wireless power transmitter 100 to stop the charging process when the wireless power receiver 110 signals that its battery is fully charged. However, other embodiments may allow the wireless power transmitter 100 to release the formed NFC pairing or MST pairing once the wireless charging starts.

Figure 3B:
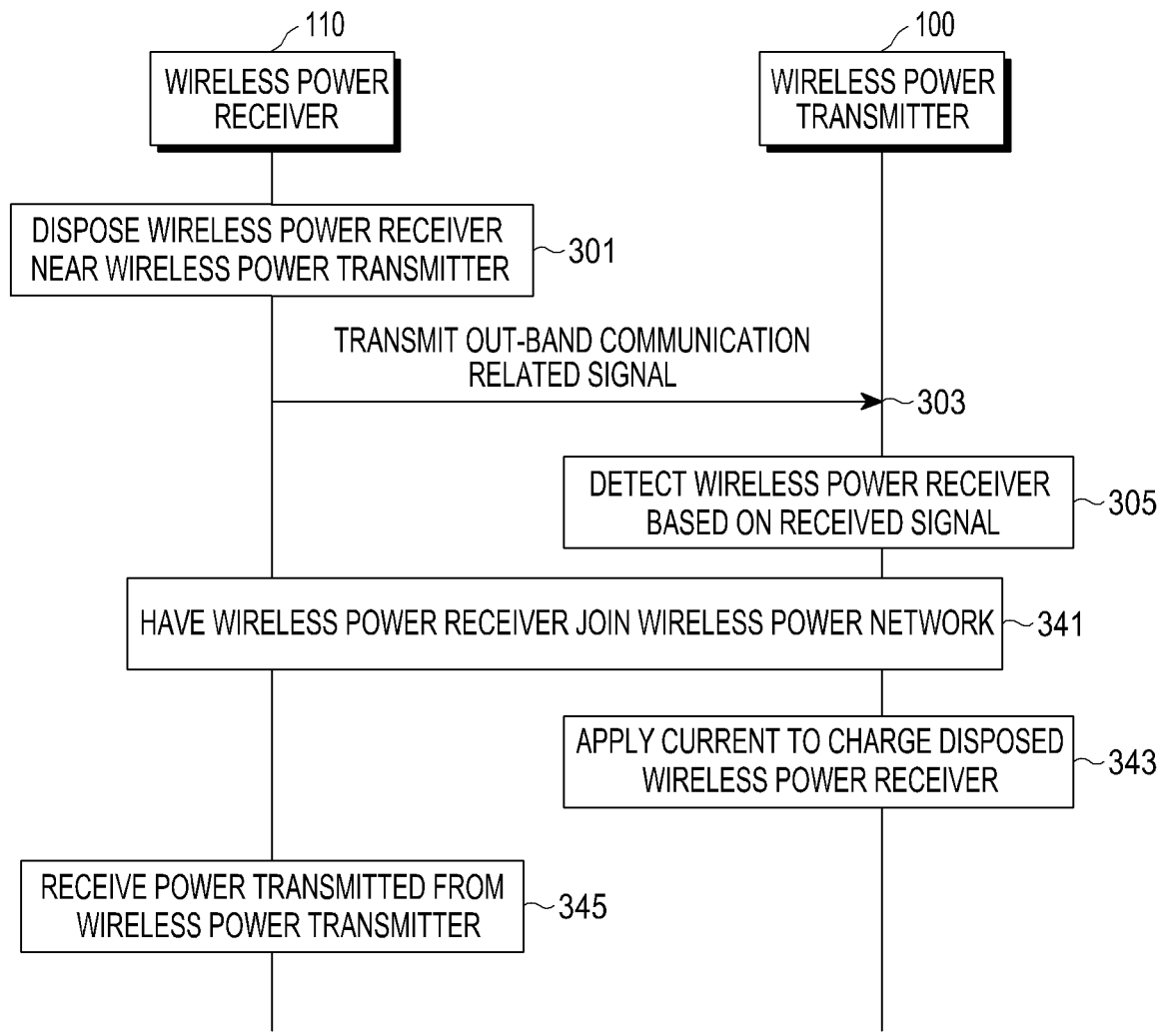
FIG. 3B is a flowchart illustrating operations of a wireless power transmitter and a wireless power receiver according to various embodiments of the present disclosure.

FIG. 3B is a flowchart illustrating operations of a wireless power transmitter and a wireless power receiver according to various embodiments of the present disclosure. Operations 301, 303, and 305 are similar to those operations described in FIG. 3A.

In operation 301, the wireless power receiver 110 may be disposed near the wireless power transmitter 100. For example, the user may dispose the wireless power receiver 110 within a charging range of the wireless power transmitter 100, for wireless charging. In operation 303, the wireless power receiver 110 may transmit an out-of-band communication signal to the wireless power transmitter 100. In operation 305, the wireless power transmitter 100 may detect the wireless power receiver 110 based on the received communication signal.

In operation 341, the wireless power transmitter 100 may have the wireless power receiver 110 join the wireless power network controlled by the wireless power transmitter 100. In various embodiments of the present disclosure, the wireless power transmitter 100 and the wireless power receiver 110 may perform communication with each other based on the Bluetooth low energy (BLE) communication scheme. The wireless power transmitter 100 may determine whether to have the wireless power receiver 110 join the wireless power network, using the BLE-based communication signal received from the wireless power receiver 110. Although the BLE communication scheme is used in the foregoing description, it will be apparent to those skilled in the art that this is merely illustrative and there is no limitation on the communication scheme that the wireless power transmitter 100 uses for wireless charging. In various embodiments of the present disclosure, the wireless power transmitter 100 may have the wireless power receiver 110 join the wireless power network based on various wireless charging related standards, and there is no limitation on the type of the communication scheme.

In operation 343, the wireless power transmitter 100 may apply a current to a coil or a resonant circuit to charge the wireless power receiver 110. As described above, magnetic field may be generated by the current flow in the coil or resonant circuit. In operation 345, the wireless power receiver 110 may receive the power transmitted by the wireless power transmitter 100. Induced current may flow in the coil or resonant circuit of the wireless power receiver 110 due to the magnetic field radiated from the wireless power transmitter 100, and the wireless power receiver 110 may use the induced current to charge its battery.

As described above, the wireless power transmitter 100 according to various embodiments of the present disclosure may perform a wireless power network joining procedure after detecting the wireless power receiver 110.

Figure 4A:
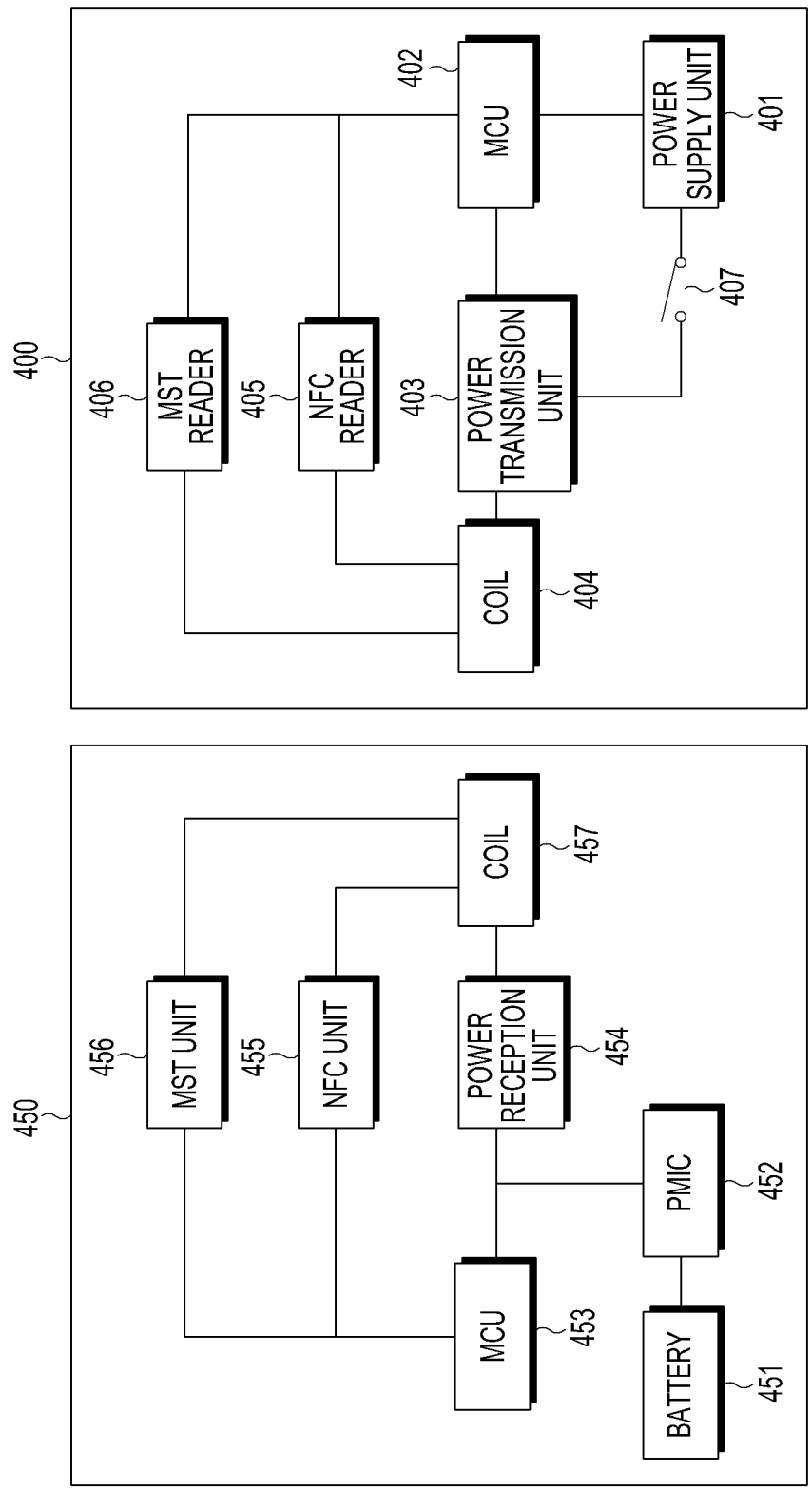
FIGS. 4A and 4B are block diagrams of a wireless power transmitter and a wireless power receiver according to various embodiments of the present disclosure.
Figure 4B:
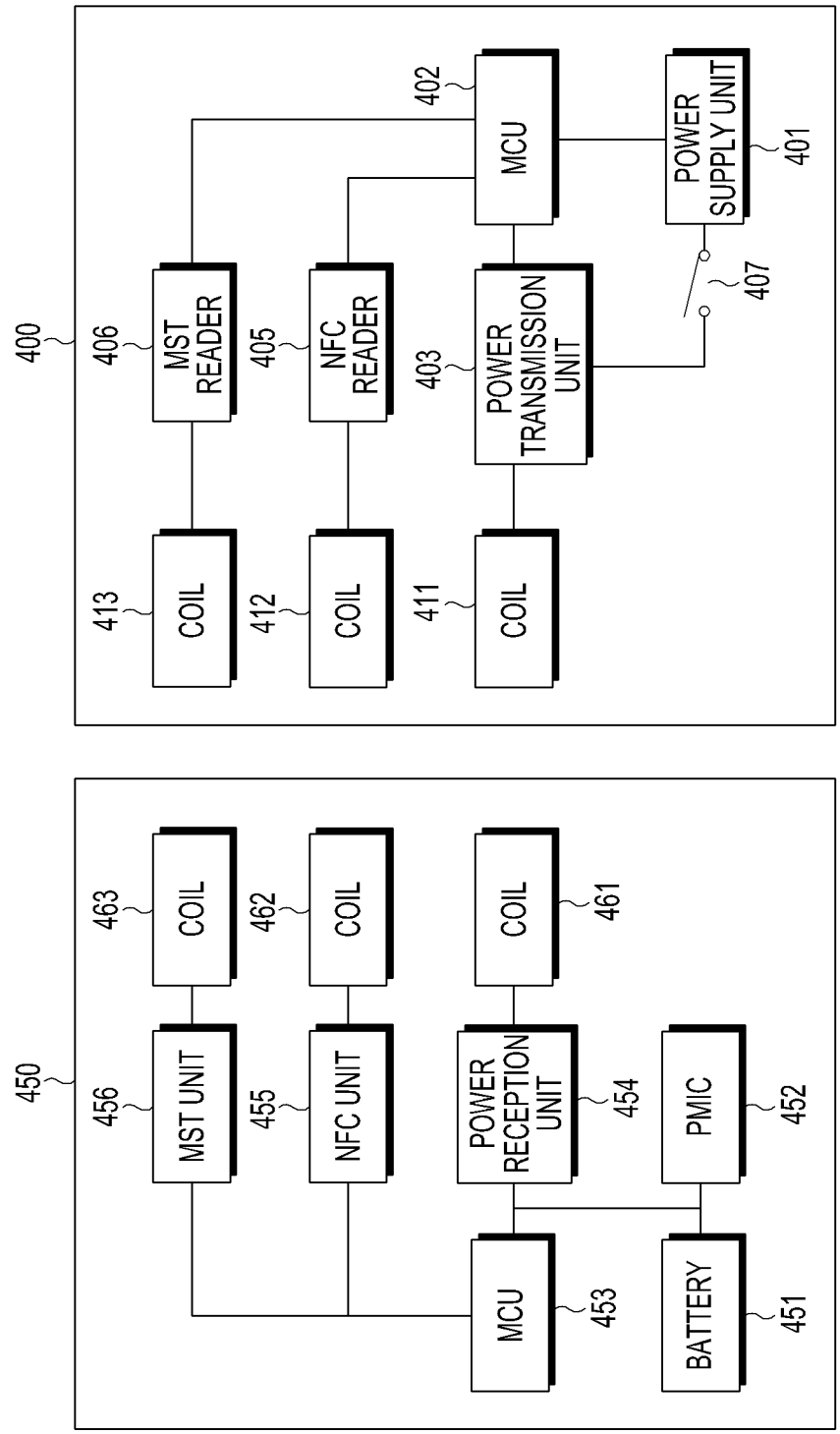

FIGS. 4A and 4B are block diagrams of a wireless power transmitter and a wireless power receiver according to various embodiments of the present disclosure.

Referring first to FIG. 4A, a wireless power transmitter 400 may include a power supply unit 401, a micro controlling unit (MCU) 402, a power transmission unit 403, a coil 404, an NFC reader 405, an MST reader 406 and a switch 407. A wireless power receiver 450 may include a battery 451, a power management integrated chip (PMIC) 452, an MCU 453, a power reception unit 454, an NFC unit 455, an MST unit 456 and a coil 457. The MCUs 402 and 453 may also be referred to as a controller or an application processor (AP) depending on the implementation.

The power supply unit 401 may supply the power required for operation of the wireless power transmitter 400, and may also supply the power received wirelessly by the wireless power receiver 450. For example, the power supply unit 401 may be connected to the power transmission unit 403 via the switch 407, and may supply power for charging the wireless power receiver 450 to the power transmission unit 403. The power supply unit 401 may receive its power from an external source by wire or wirelessly, or from a battery.

The MCU 402 may control the overall operation of the wireless power transmitter 400. The MCU 402 may analyze the data output from the NFC reader 405 and the MST reader 406, and may detect the reception of a communication signal (e.g., an NFC communication signal or an MST communication signal) based on the analysis results. Accordingly, the MCU 402 may be able to detect the presence of the wireless power receiver 450.

If it is determined that the wireless power receiver 450 is near the wireless power transmitter 400, the MCU 402 may initiate wireless charging for the wireless power receiver 450. For example, the MCU 402 may close the switch 407 so that the power supply unit 401 may be connected to the power transmission unit 403. If the switch 407 is closed, the power supply unit 401 may supply power to the power transmission unit 403 and the coil 404.

The power transmission unit 403, together with the coil 404, may wirelessly transmit power to the wireless power receiver 450. In the exemplary embodiment shown in FIG. 4A, the coil 404 is shown as a hardware component independent of the power transmission unit 403 shared by the power transmission unit 403, the NFC reader 405, and the MST reader 406. However, in various embodiments of the present disclosure, the coil 404 may be included in the power transmission unit 403. The power transmission unit 403 may include additional hardware (e.g., an amplifier, an inverter and the like) for transmitting power.

In cases where the wireless power transmitter 400 uses the resonance method, the power transmission unit 403 may include a capacitor that constitutes a resonant circuit together with the coil 404. Even in a case where the wireless power transmitter 400 performs wireless charging in an inductive method as proposed in the wireless power consortium (WPC) standard, the WPC standard may require a circuit including a coil and a capacitor. Accordingly, the power transmission unit 403 may further include the capacitor connected to the coil 404, which is required in the WPC standard even in a case where the wireless power transmitter 400 performs wireless charging using the inductive method.

In various embodiments of the present disclosure, the coil 404 may have one or more points (or taps) so that connecting to different points of the coil 404 may be like connecting to different coils. For example, the power transmission unit 403 may be connected to a first point and a second point of the coil 404 to use a part of the coil 404 as a first inductor. The NFC reader 405 may be connected to the first point and a third point to use a part of the coil 404 as a second inductor. The MST reader 406 may be connected to the first point and a fourth point of the coil 404 to use a part of the coil 404 as a third inductor. In other words, each of the power transmission unit 403, the NFC reader 405, and the MST reader 406 may use a different portion of the coil 404, and a detailed description thereof will be made below.

The NFC reader 405 may use another part of the coil 404 as its antenna, and the MST reader 406 may use still another part of the coil 404 as its antenna.

The power transmission unit 403, together with the coil 404, may wirelessly transmit the power supplied from the power supply unit 401 to the power reception unit 454 and the coil 457.

The NFC reader 405 may receive a communication signal from the NFC unit 455 of the wireless power receiver 450. In various embodiments of the present disclosure, the NFC reader 405 may operate in accordance with the NFC communication scheme and may generate, for example, an RF field. In various embodiments of the present disclosure, the NFC unit 455 may use the RF field generated by the NFC reader 405 to transmit an NFC signal. As described above, even if the battery of the wireless power receiver 450 is completely discharged, the NFC unit 455 may transmit the NFC signal to the NFC reader 405. In various embodiments of the present disclosure, the NFC unit 455 may transmit the NFC signal to the NFC reader 405 using the power supplied from the battery 451.

The NFC reader 405 may receive the NFC signal from the wireless power receiver 450, and transmit the reception result to the MCU 402. The MCU 402 may detect the disposition of the wireless power receiver 450 based on the data from the NFC reader 405. The MCU 402 may then control the switch 407 to allow the power supply unit 401 to supply power to the power transmission unit 403. Accordingly, the wireless power transmitter 400 may wirelessly transmit power to the wireless power receiver 450. In various embodiments of the present disclosure, the detected wireless power receiver 450 may join the wireless power network as stipulated by a wireless charging standard, and then the MCU 402 may control the switch 407 to allow the power supply unit 401 to supply power to the power transmission unit 403.

The MST reader 406 may receive a communication signal from the MST unit 456 of the wireless power receiver 450. In various embodiments of the present disclosure, the MST reader 406 may operate in accordance with the MST communication scheme and may generate a magnetic field. In various embodiments of the present disclosure, the MST unit 456 may transmit an MST signal to the MST reader 406 using the magnetic field generated by the MST reader 406. For example, the MST unit 456 may transmit the MST signal by modulating the received magnetic field from the MST reader 406. As described above, even if the battery of the wireless power receiver 450 is completely discharged, the MST unit 456 may transmit the MST signal to the MST reader 406. In various embodiments of the present disclosure, the MST unit 456 may transmit the MST signal to the MST reader 406 using the power supplied from the battery 451.

The MST reader 406 may receive the MST signal from the wireless power receiver 450, and transmit the reception result to the MCU 402. For example, the MST reader 406 may receive the MST signal by detecting a change in the magnetic field. The MCU 402 may detect the disposition of the wireless power receiver 450 based on the data from the MST reader 406. The MCU 402 may then control the switch 407 to allow the power supply unit 401 to supply power to the power transmission unit 403. Accordingly, the wireless power transmitter 400 may wirelessly transmit the power to the wireless power receiver 450 detected by the wireless power transmitter 400. In various embodiments of the present disclosure, the wireless power receiver 450 may join the wireless power network as stipulated by a wireless charging standard, and then the MCU 402 may control the switch 407 to allow the power supply unit 401 to supply power to the power transmission unit 403.

The battery 451 of the wireless power receiver 450 may be a rechargeable battery generally able to supply power for the overall operation of the wireless power receiver 450.

The PMIC 452 may be able to transfer power from the battery 451 to each component. The PMIC 452 may include a component capable of converting from the battery voltage to the voltages needed by each component, and a component capable of regulating power to each component.

The MCU 453 may control the overall operation of the wireless power receiver 450. For example, the MCU 453 may control at least one of the NFC unit 455 and the MST unit 456 to transmit the communication signal.

The power reception unit 454, together with the coil 457, may wirelessly receive power for the wireless power receiver 450. In the exemplary embodiment of FIG. 4A, since the power reception unit 454, the NFC unit 455 and the MST unit 456 share the coil 457, the coil 457 is shown as if the coil 457 is independent of the power reception unit 454. However, in various embodiments of the present disclosure, the coil 457 may also be included in the power reception unit 454. The power reception unit 454 may include additional hardware (e.g., a rectifier, a converter and the like) for receiving power. Otherwise, in a case where the wireless power receiver 450 performs wireless charging using the resonance method, the power reception unit 454 may include a capacitor that constitutes a resonant circuit together with the coil 457. Even in a case where the wireless power receiver 450 performs wireless charging using the inductive method as proposed in the WPC standard, the WPC standard may require a circuit including a coil and a capacitor. Accordingly, the power reception unit 454 may further include a capacitor connected to the coil 457, which is required in the WPC standard even in a case where the wireless power receiver 450 performs wireless charging using the inductive method.

In various embodiments of the present disclosure, the coil 457 may have one or more points so that connecting to different points of the coil 404 may be like connecting to different coils. For example, the power reception unit 454 may be connected to a first point and a second point of the coil 457 to use a part of the coil 457 as a first inductor. The NFC unit 455 may also be connected to the first point and a third point of the coil 457 to use another part of the coil 457 as a second inductor. The MST unit 456 may also be connected to the first point and a fourth point of the coil 457 to use still another part of the coil 457 as a third inductor. In other words, each of the power reception unit 454, the NFC unit 455, and the MST unit 456 may use a different portion of the coil 457, and a detailed description thereof will be made below.

The NFC unit 455 may use another part of the coil 457 as an antenna, and the MST unit 456 may use further another part of the coil 457 as its antenna.

FIG. 4B is a block diagram illustrating a wireless power transmitter and a wireless power receiver according to various embodiments of the present disclosure.

In the exemplary embodiment of FIG. 4B, the power transmission unit 403 of the wireless power transmitter 400 may be connected to a coil 411, the NFC reader 405 may be connected to a coil 412, and the MST reader 406 may be connected to a coil 413. In other words, each of the power transmission unit 403, the NFC reader 405, and the MST reader 406 of the wireless power transmitter 400 may be connected to its corresponding coil, without sharing a coil. The power transmission unit 403, together with the coil 411, may transmit the power to the wireless power receiver 450. The NFC reader 405 may use the coil 412 as an antenna, and the MST reader 406 may use the coil 413 as its antenna.

The power reception unit 454 of the wireless power receiver 450 may be connected to a coil 461, the NFC unit 455 may be connected to a coil 462, and the MST unit 456 may be connected to a coil 463. In other words, each of the power reception unit 454, the NFC unit 455, and the MST unit 456 of the wireless power receiver 450 may be connected to its corresponding coil, without sharing a coil. The power reception unit 454, together with the coil 461, may receive the power from the wireless power transmitter 400. The NFC unit 455 may use the coil 462 as an antenna, and the MST unit 456 may use the coil 463 as its antenna.

Figure 4C:
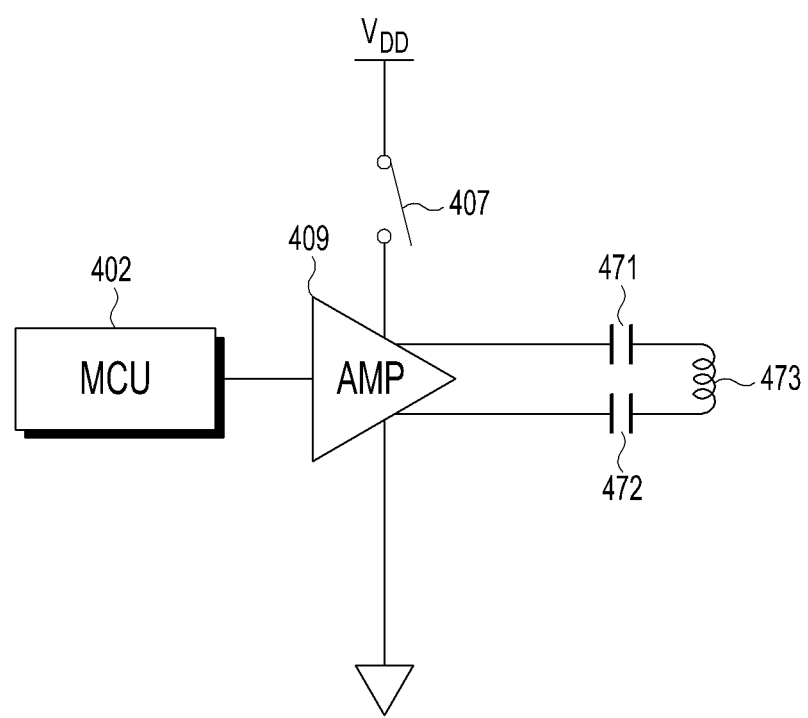
FIG. 4C is a circuit diagram for power transmission in a wireless power transmitter according to various embodiments of the present disclosure.

FIG. 4C is a circuit diagram for power transmission in a wireless power transmitter according to various embodiments of the present disclosure. In the exemplary embodiment of FIG. 4C, the wireless power transmitter 400 may include the switch 407 disposed between the power supply unit (not shown) and the amplifier 409. Upon detecting a wireless power receiver (not shown) using out-of-band communication signal, the MCU 402 may close the switch 407 so that the power supply unit (not shown) may supply power to the amplifier 409. If no out-of-band communication signal is detected, the MCU 402 may open the switch 407 so that the power supply unit (not shown) is not connected to the amplifier 409. In the example of FIG. 4C, although the wireless power transmitter is shown as if the wireless power transmitter transmits the power to the wireless power receiver based on the inductive method, this is merely illustrative and the wireless power transmitter may transmit the power to the wireless power receiver based on the resonance method.

In other words, the wireless power transmitter may include a resonant circuit that is based on the resonance method. The wireless power transmitter may operate similarly as described above for the inductive method. The wireless power transmitter may include the switch 407 disposed between the power supply unit (not shown) and the amplifier 409. Upon detecting a wireless power receiver (not shown) by detecting out-of-band communication signal, the MCU 402 may close the switch 407 so that the power supply unit (not shown) may supply power to the amplifier 409. If no out-of-band communication signal is detected, the MCU 402 may open the switch 407 so that the power supply unit (not shown) is not connected to the amplifier 409.

Figure 5:
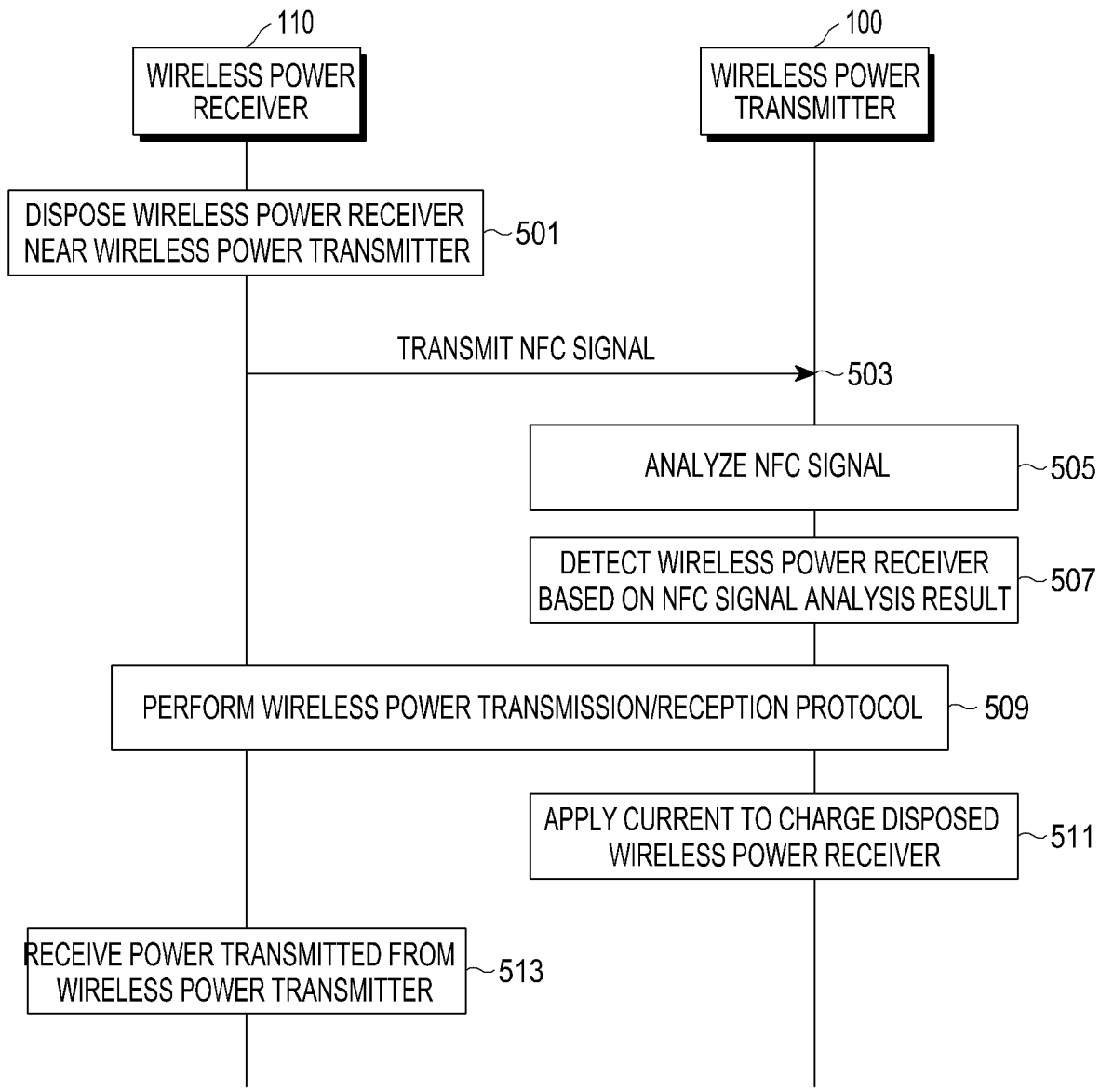
FIG. 5 is a flowchart illustrating operations of a wireless power transmitter and a wireless power receiver according to various embodiments of the present disclosure.

FIG. 5 is a flowchart illustrating operations of a wireless power transmitter and a wireless power receiver according to various embodiments of the present disclosure.

In operation 501, the wireless power receiver 110 may be disposed near the wireless power transmitter 100.

In operation 503, the wireless power receiver 110 may transmit an NFC signal. For example, the wireless power receiver 110 may transmit an NFC signal using power from the battery included therein. The PMIC of the wireless power receiver 110 may convert and regulate the power from the battery, and provide the regulated power to an NFC unit, and the NFC unit may generate an NFC signal using the provided power and transmit the NFC signal. The NFC signal may include information of the NFC unit or the wireless power receiver 110.

In operation 505, the wireless power transmitter 100 may analyze the NFC signal the wireless power receiver 110. In operation 507, the wireless power transmitter 100 may detect the wireless power receiver 110 based on the result of the NFC signal analysis.

In operation 509, the wireless power transmitter 100 may perform a wireless power transmission/reception protocol with the wireless power receiver 110. For example, in a case of the A4WP standard, the wireless power receiver 110 may need to join the wireless power network before being charged.

In operation 511, the wireless power transmitter 100 may apply a current to a power transmission unit (e.g., a coil or a resonant circuit) to charge the wireless power receiver 110. The coil or the resonant circuit of the wireless power transmitter 100 may radiate a magnetic field using the applied current.

In operation 513, the wireless power receiver 110 may receive the power transmitted from the wireless power transmitter 100. For example, the wireless power receiver 110 may receive the power from current induced by the magnetic field radiated from the wireless power transmitter 100.

Figure 6:
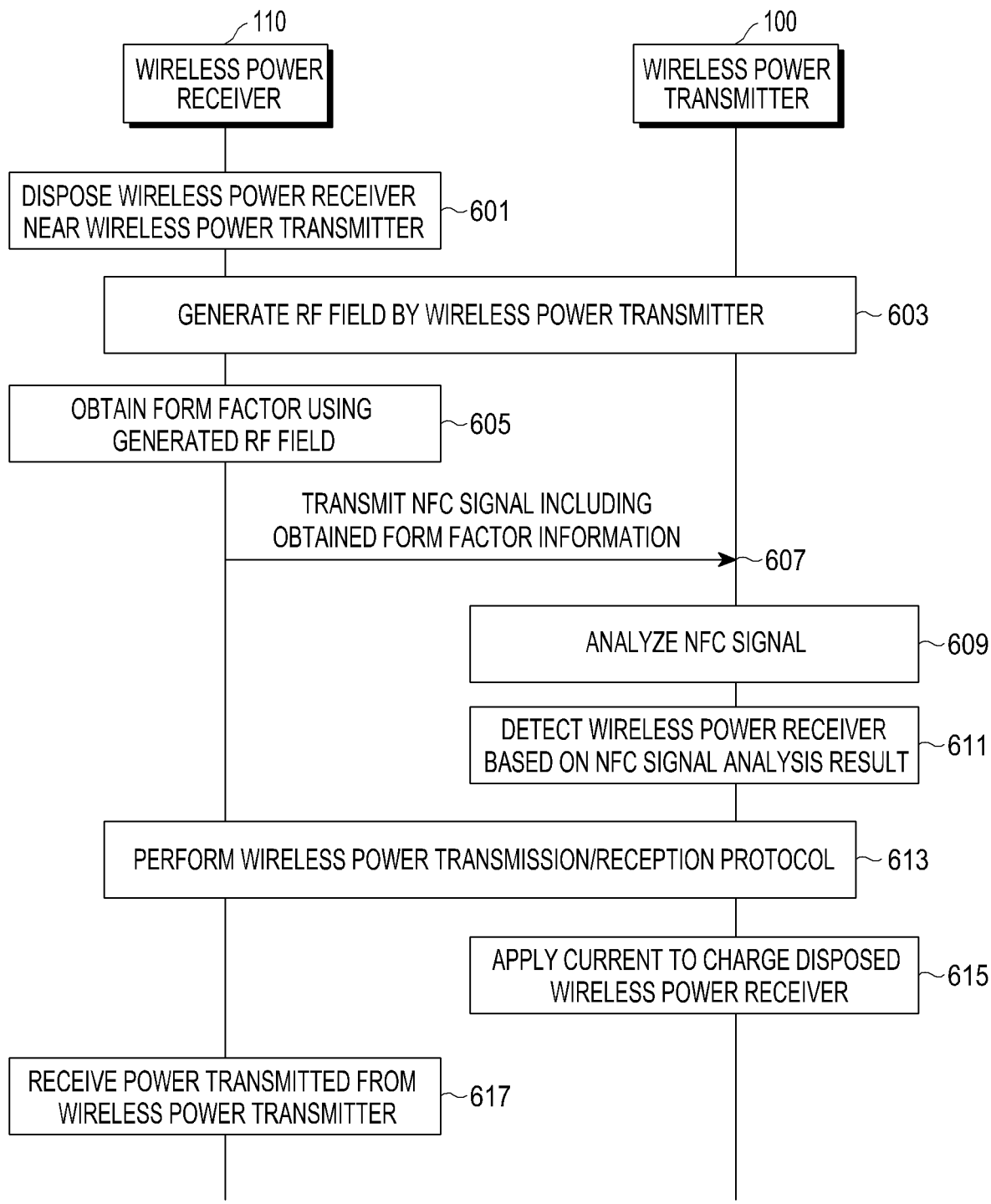
FIG. 6 is a flowchart illustrating operations of a wireless power transmitter and a wireless power receiver according to various embodiments of the present disclosure.

FIG. 6 is a flowchart illustrating operations of a wireless power transmitter and a wireless power receiver according to various embodiments of the present disclosure.

In operation 601, the wireless power receiver 110 may be disposed near the wireless power transmitter 100.

In operation 603, the wireless power transmitter 100 may generate an RF field. The wireless power receiver 110 may obtain the power required for generation and transmission of an NFC signal from the RF field generated in an NFC reader of the wireless power transmitter 100. In operation 605, the wireless power receiver 110 may obtain a form factor using the generated RF field. In operation 607, the wireless power receiver 110 may transmit the NFC signal including the obtained form factor to the wireless power transmitter 100.

In operation 609, the wireless power transmitter 100 may analyze the NFC signal. In operation 611, the wireless power transmitter 100 may detect the wireless power receiver 110 based on the result of the NFC signal analysis. In operation 613, the wireless power transmitter 100 may perform a wireless power transmission/reception protocol. In operation 615, the wireless power transmitter 100 may apply a current to a coil or a resonant circuit, for charging the wireless power receiver 110. The coil or the resonant circuit of the wireless power transmitter 100 may radiate a magnetic field using the applied current. In operation 617, the wireless power receiver 110 may receive the power transmitted from the wireless power transmitter 100. For example, the magnetic field radiated from the wireless power transmitter 100 may induce current in the wireless power receiver 110.

Figure 7:
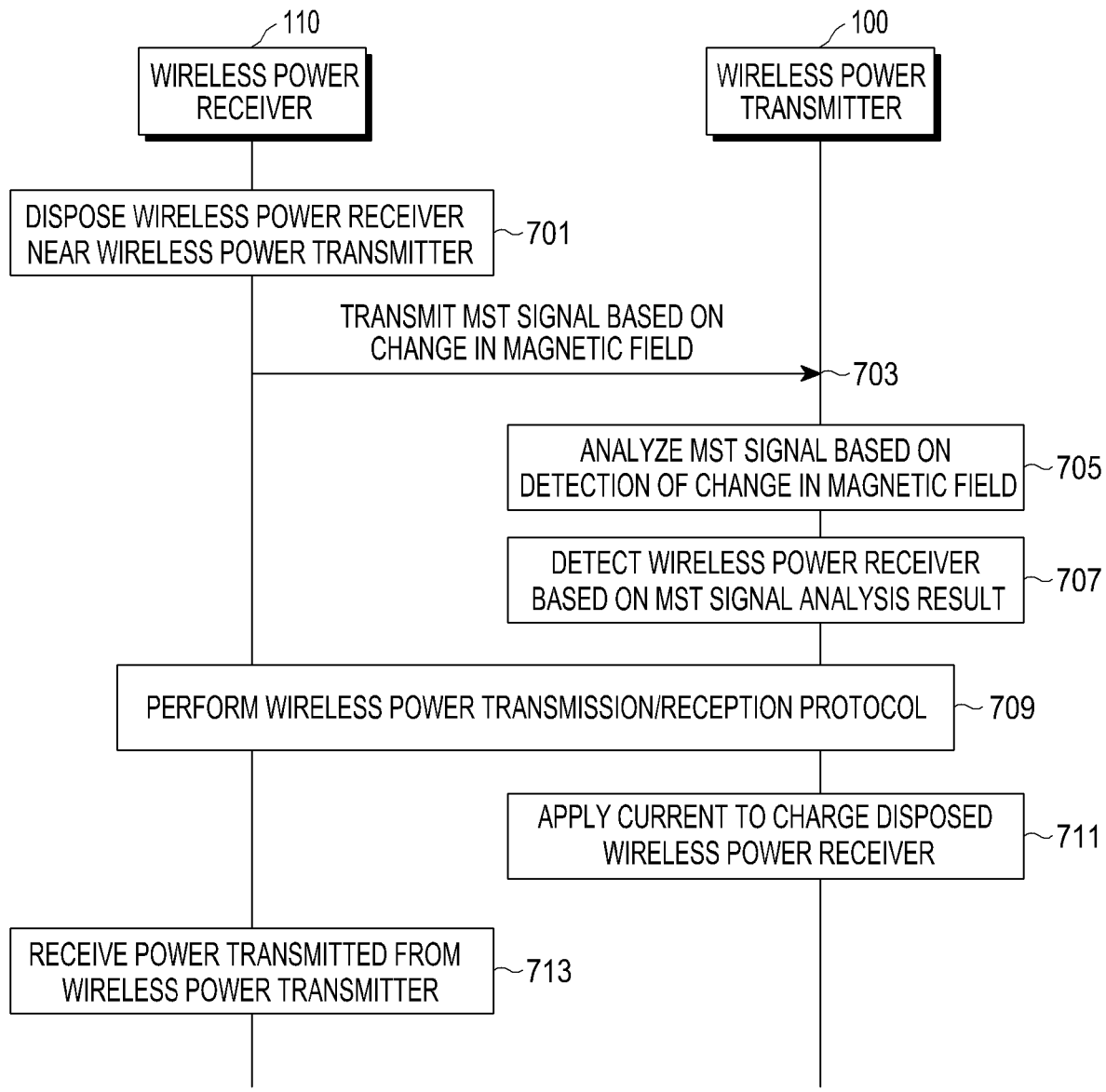
FIG. 7 is a flowchart illustrating operations of a wireless power transmitter and a wireless power receiver according to various embodiments of the present disclosure.

FIG. 7 is a flowchart illustrating operations of a wireless power transmitter and a wireless power receiver according to various embodiments of the present disclosure.

In operation 701, the wireless power receiver 110 may be disposed near the wireless power transmitter 100.

In operation 703, the wireless power receiver 110 may transmit an MST signal. For example, the wireless power receiver 110 may transmit an MST signal using the power of the battery included therein. The PMIC of the wireless power receiver 110 may convert and regulate the power from the battery, and provide the regulated power to an MST unit, and the MST unit may generate an MST signal using the provided power and transmit the MST signal. For example, the wireless power receiver 110 may modulate the magnetic field in a specific pattern before transmitting it as the MST signal.

In operation 705, the wireless power transmitter 100 may analyze the MST signal. For example, the wireless power transmitter 100 may analyze the MST signal by detecting the change in the magnetic field by the MST unit. More specifically, the MST reader of the wireless power transmitter 100 may include a coil, or may be connected to the coil. The magnetic field from the MST unit may induce current to be generated in a coil included in or connected to the MST reader. The MST reader may analyze the MST signal by detecting the induced current from the coil.

In operation 707, the wireless power transmitter 100 may detect the wireless power receiver 110 based on the result of the MST signal analysis.

In operation 709, the wireless power transmitter 100 may perform a wireless power transmission/reception protocol with the wireless power receiver 110. For example, in a case where the wireless power transmitter 100 performs wireless charging based on the A4WP standard, the wireless power receiver 110 may join the wireless power network prior to being charged by the wireless power transmitter 100.

In operation 711, the wireless power transmitter 100 may apply a current to a power transmission unit (e.g., a coil or a resonant circuit) to transmit power to the wireless power receiver 110. The coil or the resonant circuit of the wireless power transmitter 100 may radiate a magnetic field using the applied current.

In operation 713, the wireless power receiver 110 may receive the power transmitted from the wireless power transmitter 100. For example, the wireless power receiver 110 may receive the power current induced by the magnetic field radiated from the wireless power transmitter 100.

Figure 8:
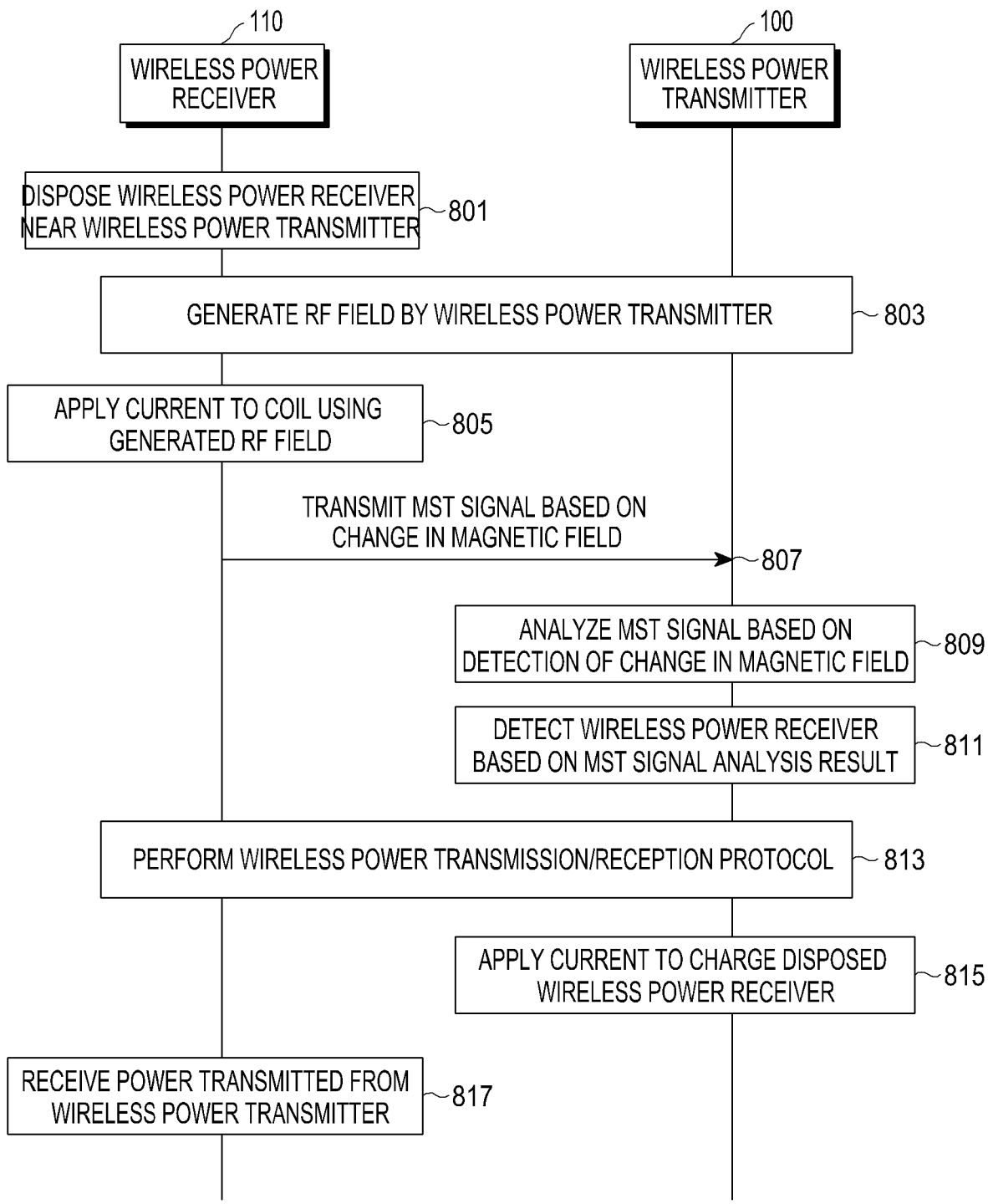
FIG. 8 is a flowchart illustrating operations of a wireless power transmitter and a wireless power receiver according to various embodiments of the present disclosure.

FIG. 8 is a flowchart illustrating operations of a wireless power transmitter and a wireless power receiver according to various embodiments of the present disclosure.

In operation 801, the wireless power receiver 110 may be disposed near the wireless power transmitter 100.

In operation 803, the wireless power transmitter 100 may generate an RF field. The wireless power receiver 110 may obtain the power required for generation and transmission of an MST signal from the RF field generated in an MST reader of the wireless power transmitter 100. In operation 805, the wireless power receiver 110 may apply a current to a coil included in or connected to the MST unit using the generated RF field. In operation 807, the wireless power receiver 110 may transmit the MST signal to the wireless power transmitter 100 after modulating the magnetic field with current applied to the coil.

In operation 809, the wireless power transmitter 100 may analyze the MST signal. In operation 811, the wireless power transmitter 100 may detect the wireless power receiver 110 based on the result of the MST signal analysis. In operation 813, the wireless power transmitter 100 may perform a wireless power transmission/reception protocol. In operation 815, the wireless power transmitter 100 may apply a current to a coil or a resonant circuit to transmit power to the wireless power receiver 110. The coil or the resonant circuit of the wireless power transmitter 100 may radiate a magnetic field using the applied current. In operation 817, the wireless power receiver 110 may receive the power transmitted from the wireless power transmitter 100. For example, the wireless power receiver 110 may receive the power by current induced from the magnetic field radiated from the wireless power transmitter 100.

Figure 9:
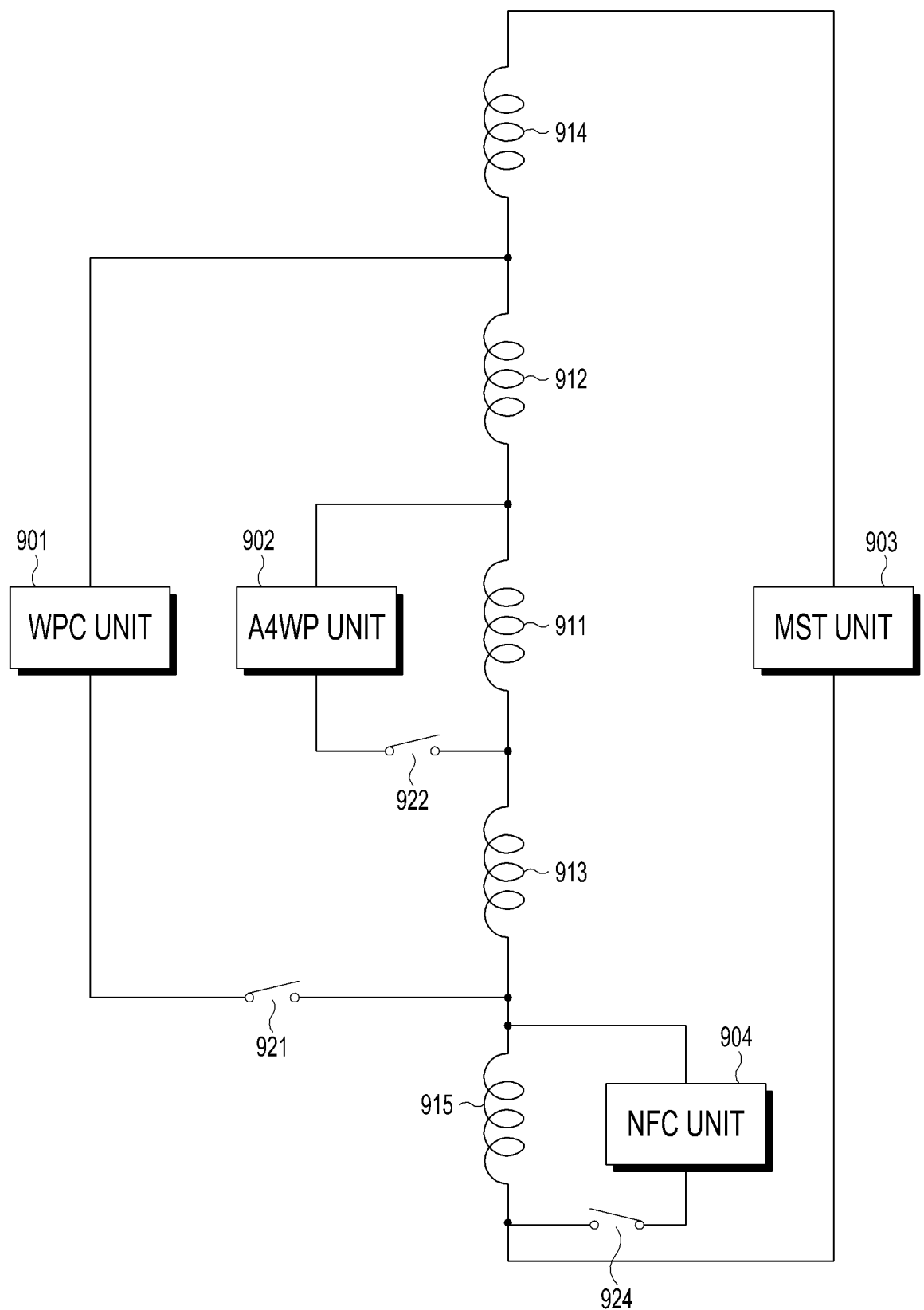
FIG. 9 is a diagram illustrating sharing coils by a power transmission unit and an out-of-band communication module according to various embodiments of the present disclosure.

FIG. 9 is a diagram illustrating sharing coils by a power transmission unit and an out-of-band communication module according to various embodiments of the present disclosure.

As illustrated in FIG. 9, a wireless power transmitter may include a first sub-coil 911, a second sub-coil 912, a third sub-coil 913, a fourth sub-coil 914 and a fifth sub-coil 915. The first to fifth sub-coils 911 to 915 may be implemented in the form of one coil by being connected in series to each other.

For an A4WP unit 902, its first input may be connected to the first end of the first sub-coil 911, and its second input may be connected to the second end of the first sub-coil 911. A first switch 922 may be disposed between the second input of the A4WP unit 902 and the first sub-coil 911. If it is determined that the wireless power transmitter performs wireless charging based on the A4WP standard, a controller (not shown) may close the first switch 922 so that the A4WP unit 902 may be connected to the first sub-coil 911. The A4WP unit 902 may include at least some of the wireless power transmission elements required in the A4WP standard. In addition, the first sub-coil 911 may be designed to have an inductance required by the A4WP standard.

For a WPC unit 901, its first input may be connected to the first end of the second sub-coil 912, and its second input may be connected to the second end of the third sub-coil 913. The second end of the second sub-coil 912 may be connected to the first end of the first sub-coil 911, and the first end of the third sub-coil 913 may be connected to the second end of the first sub-coil 911. A second switch 921 may be disposed between the second input of the WPC unit 901 and the third sub-coil 913. If it is determined that the wireless power transmitter performs wireless charging based on the WPC standard, a controller (not shown) may close the second switch 921 so that the WPC unit 901 may be connected to the first sub-coil 911, the second sub-coil 912 and the third sub-coil 913. The WPC unit 901 may include at least some of the wireless power transmission elements required in the WPC standard. In addition, the first sub-coil 911, the second sub-coil 912, and the third sub-coil 913 may be designed to have an inductance required by the WPC standard.

For an MST unit 903, its first input may be connected to the first end of the fourth sub-coil 914, and its second input may be connected to the second end of the fifth sub-coil 915. The second end of the fourth sub-coil 914 may be connected to the first end of the second sub-coil 912, and first end of the fifth sub-coil 915 may be connected to the second end of the third sub-coil 913. In other words, the MST unit 903 may be connected to the first to fifth sub-coils 911 to 915. The MST unit 903 may include at least some of the elements required by the MST standard. In addition, the first to fifth sub-coils 911 to 915 may be designed to have an inductance required by the MST standard.

For an NFC unit 904, its first input may be connected to the first end of the fifth sub-coil 915, and its second input may be connected to the second end of the fifth sub-coil 915. A third switch 924 may be disposed between the second input of the NFC unit 904 and the fifth sub-coil 915. If it is determined that the wireless power transmitter performs NFC communication, a controller (not shown) may close the third switch 924 so that the NFC unit 904 may be connected to the fifth sub-coil 915. The NFC unit 904 may include at least some of the elements required by the NFC standard. In addition, the fifth sub-coil 915 may be designed to have an inductance required by the NFC standard.

Figure 10:
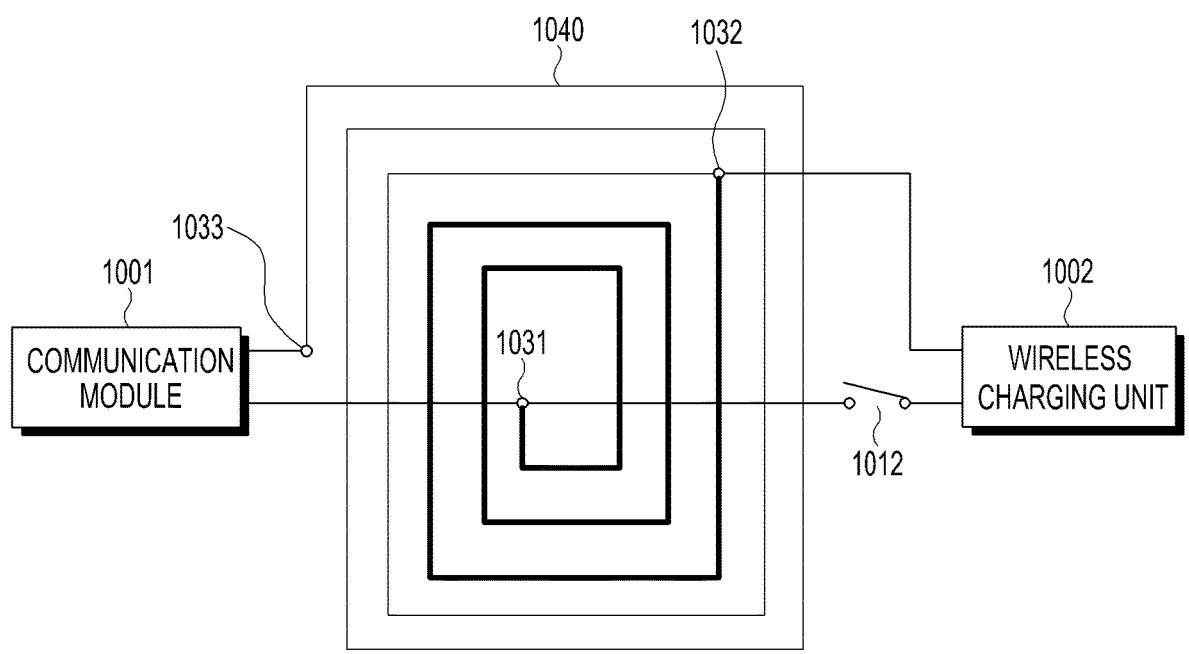
FIG. 10 is a diagram illustrating sharing a coil by a communication module and a wireless charging unit according to various embodiments of the present disclosure.

FIG. 10 is a diagram illustrating sharing a coil by a communication module and a wireless charging unit according to various embodiments of the present disclosure.

A wireless power transmitter may use a coil 1040. A first input of a communication module 1001 of the wireless power transmitter may be connected to a first point 1031 of the coil 1040, and a second input of the communication module 1001 may be connected to a third point 1033 of the coil 1040. In addition, a first input of a wireless charging unit 1002 of the wireless power transmitter may be connected to the first point 1031 of the coil 1040, and a second input of the wireless charging unit 1002 may be connected to a second point 1032 of the coil 1040. In other words, the communication module 1001 of the wireless power transmitter may be connected from the first point 1031 to the third point 1033 of the coil 1040, and the wireless charging unit 1002 of the wireless power transmitter may be connected to a part of the coil 1040 from the first point 1031 to the second point 1032. The frequency used by the communication module 1001 may be different from the frequency used by the wireless charging unit 1002. Accordingly, the communication module 1001 and the wireless charging unit 1002 may be connected to coils of different lengths for the frequencies required in the communication standard and the wireless charging standard.

In various embodiments of the present disclosure, a width of a part (e.g., a wire from the first point 1031 to the second point 1032) of the coil 1040, which is connected to the wireless charging unit 1002, may be greater than a width of a wire from the second point 1032 to the third point 1033. The wireless charging unit 1002 may use relatively higher power, compared with the communication module 1001, so a width of its wire may be designed to be relatively wider to decrease the resistance. This will help prevent increase in power consumption and the resulting rise in heat output. Other embodiments of the disclosure may have same width wire over the entirety of the coil 1040. Although the term "wire" is used, it should be understood that "wire" is a generic word for a conductive path, and the conductive path may also be referred to as a "trace."

When performing wireless charging, a controller (not shown) may close a switch 1012 so that the wireless charging unit 1002 may use a partial coil from the first point 1031 to the second point 1032 of the coil 1040.

Figure 11:
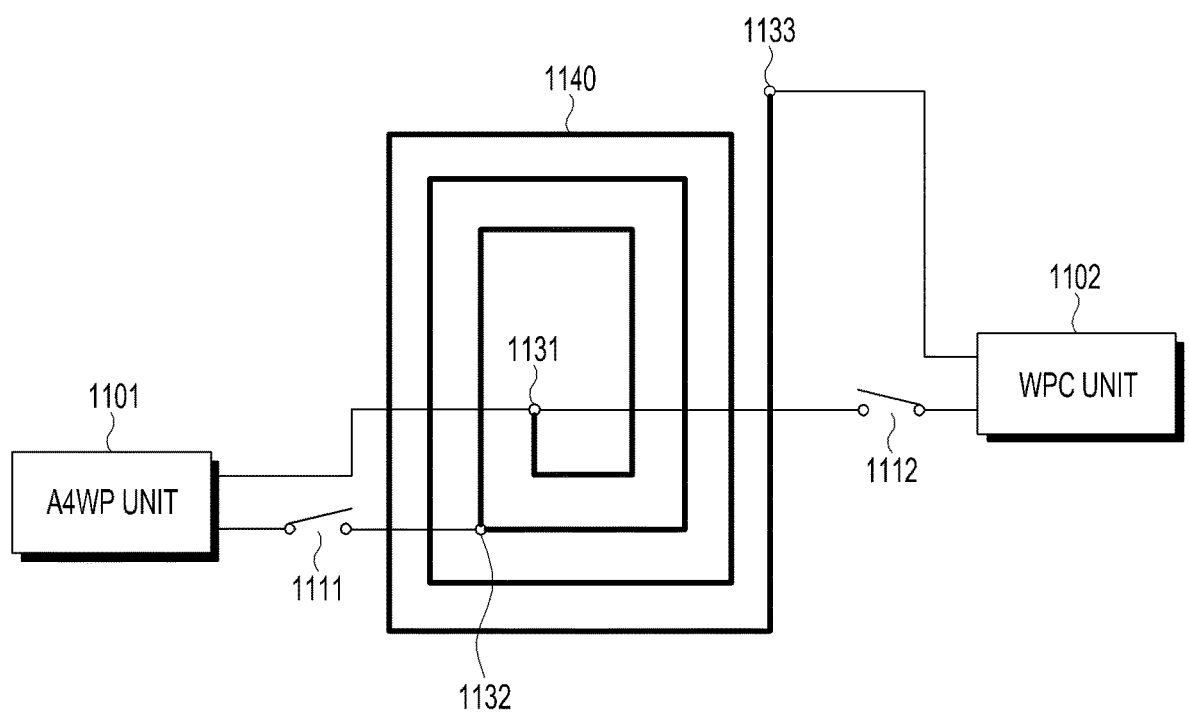
FIG. 11 is a diagram illustrating sharing a coil by different wireless charging standard units according to various embodiments of the present disclosure.

FIG. 11 is a diagram illustrating sharing a coil by different wireless charging standard units according to various embodiments of the present disclosure.

A wireless power transmitter may include a coil 1140. A first input of an A4WP unit 1101 of the wireless power transmitter may be connected to a first point 1131 of the coil 1140, and a second input of the A4WP unit 1101 may be connected to a second point 1132 of the coil 1140. In addition, a first input of a WPC unit 1102 of the wireless power transmitter may be connected to the first point 1131 of the coil 1140, and a second input of the WPC unit 1102 may be connected to a third point 1133 of the coil 1140. In other words, the A4WP unit 1101 of the wireless power transmitter may be connected to a partial coil from the first point 1131 to the second point 1132 of the coil 1140, and the WPC unit 1102 of the wireless power transmitter may be connected to a partial coil from the first point 1131 to the third point 1133 of the coil 1140. The frequency used by the A4WP unit 1101 may be different from the frequency used by the WPC unit 1102. Accordingly, the A4WP unit 1101 and the WPC unit 1102 may be connected to coils of different lengths so as to meet the frequency conditions required in their wireless charging standards.

If it is determined that the wireless power transmitter performs wireless charging based on the A4WP standard, a controller (not shown) may close a switch 1111 so that the A4WP unit 1101 may use the part of the coil 1140 from the first point 1131 to the second point 1132. If it is determined that the wireless power transmitter performs wireless charging based on the WPC standard, the controller (not shown) may close a switch 1112 so that the WPC unit 1102 may use the coil 1140 from the first point 1131 to the third point 1133.

Figure 12:
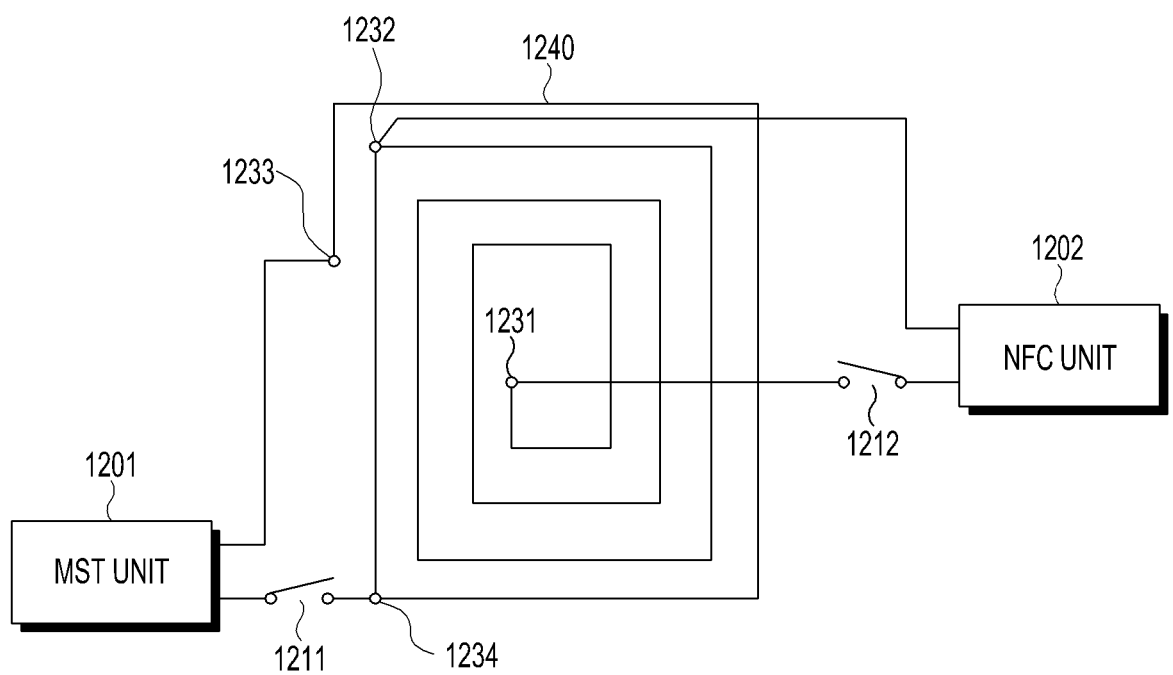
FIG. 12 is a diagram illustrating sharing a coil by different communication standard units according to various embodiments of the present disclosure.

FIG. 12 is a diagram illustrating sharing a coil by different communication standard units according to various embodiments of the present disclosure.

A wireless power transmitter may include a coil 1240. A first input of an MST unit 1201 of the wireless power transmitter may be connected to a fourth point 1234 of the coil 1240, and a second input of the MST unit 1201 may be connected to a third point 1233 of the coil 1240. In addition, a first input of an NFC unit 1202 of the wireless power transmitter may be connected to the first point 1231 of the coil 1240, and a second input of the NFC unit 1202 may be connected to a second point 1232 of the coil 1240. In other words, the MST unit 1201 of the wireless power transmitter may be connected to the part of the coil 1240 from the first point 1231 to the third point 1233, and the NFC unit 1202 of the wireless power transmitter may be connected to the part of the coil 1240 from the first point 1231 to the second point 1232. The frequency used by the MST unit 1201 may be different from the frequency used by the NFC unit 1202. Accordingly, the MST unit 1201 and the NFC unit 1202 may be connected to coils of different lengths so as to meet the frequency requirements of their communication standards.

If it is determined that the wireless power transmitter performs communication based on the MST standard, a controller (not shown) may close a switch 1211 so that the MST unit 1201 may use the coil 1240 from the first point 1231 to the third point 1233. If it is determined that the wireless power transmitter performs communication based on the NFC standard, the controller (not shown) may close a switch 1212 so that the NFC unit 1202 may use a part of the coil 1240 from the first point 1231 to the second point 1232.

Figure 13:
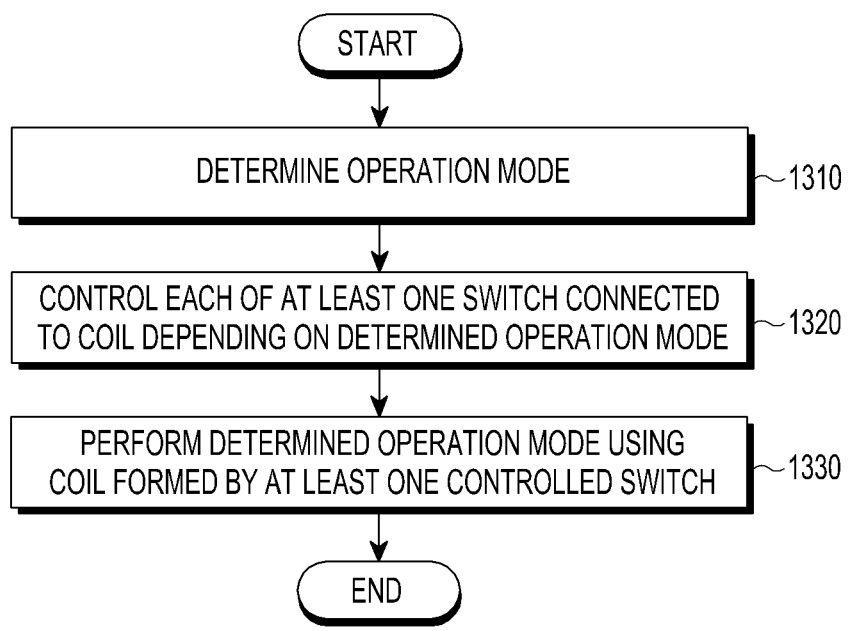
FIG. 13 is a flowchart illustrating a control method of a wireless power transmitter according to various embodiments of the present disclosure.

FIG. 13 is a flowchart illustrating a control method of a wireless power transmitter according to various embodiments of the present disclosure.

In operation 1310, a wireless power transmitter may determine an operation mode. For example, the wireless power transmitter may determine a mode for performing the wireless charging. The wireless power transmitter may determine one of the resonance method (A4WP standard) or the inductive method (WPC standard) as a wireless charging mode. The wireless power transmitter may also determine a mode for communication. The wireless power transmitter may determine any one of a variety of communication schemes as the communication mode.

In operation 1320, the wireless power transmitter may control each of at least one switch connected to the coil depending on the determined operation mode. As described with reference to FIGS. 9 to 11, the wireless charging unit and the communication module may be connected to various points (or taps) of the coil. In addition, the plurality of sub-wireless charging units of the wireless charging unit may be connected to various points of the coil, and the plurality of sub-communication modules of the communication module may be connected to various points of the coil. In addition, a switch may be disposed between a point of the coil and a hardware component. The wireless power transmitter may determine a hardware component to be connected to the coil depending on the determined operation mode, and close a corresponding switch. For example, if the wireless power transmitter determines to perform wireless charging based on the A4WP standard, the wireless power transmitter may close the switch corresponding to the A4WP unit so that a part of the coil may be connected to the A4WP unit.

In operation 1330, the wireless power transmitter may perform the determined operation mode by controlling the appropriate switches. As described above, the wireless power transmitter may close the switch corresponding to the A4WP unit so that a part of the coil may be connected to the A4WP unit. Accordingly, the wireless power transmitter may apply a current to a part of the coil, and may perform wireless charging based on the A4WP standard by forming electromagnetic waves in the resonant circuit formed by the coil and the capacitor.

In various embodiments of the present disclosure, a control method of a wireless power transmitter for charging a wireless power receiver may include receiving an out-of-band communication from the wireless power receiver, and transmitting power to the wireless power receiver by applying a power charging current to a power transmission unit in response to receiving the out-of-band communication.

In various embodiments of the present disclosure, the out-of-band communication may use one of a near field communication (NFC) standard and a magnetic secure transfer (MST) standard.

In various embodiments of the present disclosure, the out-of-band communication from the wireless power receiver may be received in an active mode. Active mode may refer to an operation where both entities communicating with each other have operating power. Passive mode may refer to an operation where at least one of the entities does not have operating power.

In various embodiments of the present disclosure, receiving the out-of-band communication from the wireless power receiver in a passive mode may include generating a radio frequency (RF) field for transmission, and receiving the out-of-band communication from the wireless power receiver that was generated from the RF field. The wireless power receiver may, for example, glean power from the RF field and modulate the RF field to send out-of-band communication signal to the entity that generated the RF field.

In various embodiments of the present disclosure, receiving the out-of-band communication from the wireless power receiver may include forming a pairing with the wireless power receiver in response to receiving the out-of-band communication signal from the wireless power receiver, applying a current to the power transmission unit by the controller in response to the pairing, and releasing the pairing after applying the current.

In various embodiments of the present disclosure, the control method of the wireless power transmitter may further include avoiding applying the current to the power transmission unit before receiving the out-of-band communication signal from the wireless power receiver.

In various embodiments of the present disclosure, the control method of the wireless power transmitter may further include determining a communication type for the out-of-band communication with the wireless power receiver, and activating at least one sub-communication module of a communication module based on the communication type.

Each of above-described components of the wireless power transmitter may be configured with one or more components, the names of which may vary depending on the type of the wireless power receiver. In various embodiments, the wireless power transmitter may include at least one of the above-described components, and some embodiments may further include other components. Furthermore, multiple components of the wireless power transmitter according to various embodiments of the present disclosure may be configured as one entity by being combined, thereby performing the previous functions of the multiple components in the same manner.

The term 'unit' as used herein may refer to a unit that includes, for example, a combination of hardware, software, and/or firmware. The term 'unit' may be interchangeably used with terms such as, for example, module, logic, logical block, component, or circuit. The unit may be the minimum unit of an integrally constructed part or a part thereof. The unit may be the minimum unit for performing one or more functions, or a part thereof. The unit may be implemented mechanically or electronically. For example, the module may include at least one of an application-specific integrated circuit (ASIC) chip, field-programmable gate arrays (FPGAs), or a programmable-logic device, and other devices that are known or will be developed in the future.

A module or a programming module according to various embodiments of the present disclosure may include at least one of the above-described components, some of which may be omitted, or may further include additional other components. Operations performed by a module, a programming module or other components according to various embodiments of the present disclosure may be performed in a sequential, parallel, iterative or heuristic way. Some operations may be performed in a different order or omitted, or other operations may be added.

As is apparent from the foregoing description, an aspect of various embodiments of the present disclosure may provide a wireless power transmitter for detecting a wireless power receiver based on the detection of an out-of-band communication signal, and a control method thereof.

Embodiments disclosed herein have been presented to help understand the disclosed technical details and are not intended to limit the scope of the present disclosure. Therefore, the scope of the present disclosure should be construed to include all modifications or various other embodiments based on the technical concept of the present disclosure.

What is claimed is:

1. A wireless power transmitter, comprising:
   a power supply;
   a power transmission unit configured to wirelessly transmit power for charging a wireless power receiver, by using a current applied from the power supply;
   a communication module comprising a plurality of communication sub-modules sharing a first coil, wherein each of the plurality of communication sub-modules is associated with a corresponding communication scheme among a plurality of communication schemes, wherein the plurality of communication sub-modules comprises a near-field communication sub-module, wherein the first coil is shared by the near-field communication sub-module and the power transmission unit, wherein a first input of each of the near-field communication sub-module and the power transmission unit is connected to a first point of the first coil and a second input of the near-field communication sub-module and a second input of the power transmission unit are connected to different points of the first coil, so that a length of the first oil corresponding to the near-field communication sub-module and a length of the first coil corresponding to the power transmission unit are different, and wherein a width of a trace in the first coil corresponding to the power transmission unit and a width of a trace in the first coil corresponding to the near-field communication sub-module are different; and a controller configured to:
in response to receiving a communication signal from the wireless power receiver, identify one of the plurality of communication sub-modules corresponding to a communication scheme associated with the received communication signal,
control the identified one of the plurality of communication sub-modules to establish a pairing with the wireless power receiver, and
based on the established pairing with the wireless power receiver, control the power supply to apply the current to the power transmission unit to wirelessly transmit power to the wireless power receiver.

2. The wireless power transmitter of claim 1, wherein the near-field communication sub-module is configured to receive the communication signal in an active mode.

3. The wireless power transmitter of claim 1, wherein the near-field communication sub-module is configured to generate a radio frequency (RF) field in a passive mode, and receive the communication signal generated from the RF field.

4. The wireless power transmitter of claim 1, wherein the near-field communication sub-module is configured to release the pairing after the power supply applies the current.

5. The wireless power transmitter of claim 1, wherein the controller is further configured to avoid applying the current to the power transmission unit before receiving the communication signal.

6. The wireless power transmitter of claim 1, wherein each of the plurality of communication sub-modules is connected to two points of the first coil so that each of the plurality of communication sub-modules is associated with an appropriate length of the first coil for its corresponding communication scheme.

7. The wireless power transmitter of claim 6, further comprising a plurality of switches, each of the plurality of switches disposed between the first coil and a corresponding one of the plurality of communication sub-modules,
wherein the controller is further configured to control the plurality of switches based on the communication scheme associated with the received communication signal.

8. The wireless power transmitter of claim 1, wherein the power transmission unit includes a plurality of sub-power transmission units that share the first coil.

9. The wireless power transmitter of claim 8, wherein each of the plurality of sub-power transmission units operates based on a different wireless charging standard.

10. The wireless power transmitter of claim 8, further comprising a plurality of switches, each of which is disposed between the first coil and a corresponding, one of the plurality of sub-power transmission units,
wherein the controller is further configured to control the plurality of switches based on a wireless charging standard to be used.

11. The wireless power transmitter of claim 8, wherein a first input of each of the plurality of sub-power transmission units is connected to the first point of the first coil and a second input of each of the plurality of sub-power transmission units is connected to a different point of the first coil, so that a length of the first coil corresponding, to each of the plurality of sub-power transmission units is different.

12. The wireless power transmitter of claim 1, further comprising:
a first switch disposed between the power transmission unit and the first coil; and
a second switch disposed between the near-field communication sub-module and the first coil,
wherein the controller is further configured to:
close the first switch while the wireless power transmitter is charging the wireless power receiver, and
open the first switch and close the second switch while the wireless power transmitter is in a standby mode.

13. The wireless power transmitter of claim 1, wherein the width of the trace in the length of the first coil corresponding to the power transmission unit is greater than the width of the trace in the length of the first coil corresponding to the near-field communication sub-module.

* * * * *